US011346215B2

(12) United States Patent
Vempati et al.

(10) Patent No.: US 11,346,215 B2
(45) Date of Patent: May 31, 2022

(54) METHODS OF EVALUATING DRILLING PERFORMANCE, METHODS OF IMPROVING DRILLING PERFORMANCE, AND RELATED SYSTEMS FOR DRILLING USING SUCH METHODS

(71) Applicant: Baker Hughes Holdings LLC, Houston, TX (US)

(72) Inventors: Chaitanya K. Vempati, Conroe, TX (US); Tisha Dolezal, The Woodlands, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 370 days.

(21) Appl. No.: 16/255,441

(22) Filed: Jan. 23, 2019

(65) Prior Publication Data

US 2019/0226333 A1 Jul. 25, 2019

Related U.S. Application Data

(60) Provisional application No. 62/620,918, filed on Jan. 23, 2018.

(51) Int. Cl.
*E21B 49/00* (2006.01)
*G01V 11/00* (2006.01)
(Continued)

(52) U.S. Cl.
CPC .......... *E21B 49/003* (2013.01); *G01V 11/002* (2013.01); *E21B 41/0092* (2013.01);
(Continued)

(58) Field of Classification Search
CPC ....... E21B 49/003; G01R 21/00; G01R 21/06; G06Q 30/0283; H02J 3/00
See application file for complete search history.

(56) References Cited

U.S. PATENT DOCUMENTS

| | | |
|---|---|---|
| 4,798,988 A | 1/1989 | Mitsutsuka |
| 4,815,342 A | 3/1989 | Brett et al. |

(Continued)

FOREIGN PATENT DOCUMENTS

| | | |
|---|---|---|
| CA | 2009654 | 2/1991 |
| CN | 1462866 A | 12/2003 |

(Continued)

OTHER PUBLICATIONS

NPL_441_1 Search Results, Jul. 23, 2021, 1 pp. (year: 2021).*

(Continued)

*Primary Examiner* — Toan M Le
*Assistant Examiner* — Xiuqin Sun
(74) *Attorney, Agent, or Firm* — TraskBritt

(57) ABSTRACT

A method for evaluating or improving performance of a drilling operation includes, during the drilling operation, receiving a performance parameter of a component of a drilling system measured by a sensor of the drilling system. The measured performance parameter is compared to a target performance parameter of the component of the drilling system. The target performance parameter includes a performance parameter of a prior drilling operation measured under substantially similar drilling conditions and measured at at least one of substantially a same drilling depth, substantially a same depth percent, and substantially a same drilling time. A performance attribute value is determined by calculating a normalized, weighted average difference between the measured performance parameter and the target performance parameter.

19 Claims, 6 Drawing Sheets

(51) Int. Cl.
  *G01V 1/50* (2006.01)
  *G01V 1/34* (2006.01)
  *E21B 41/00* (2006.01)
(52) U.S. Cl.
  CPC .............. *G01V 1/345* (2013.01); *G01V 1/50*
         (2013.01); *G01V 2210/74* (2013.01)

(56) References Cited

U.S. PATENT DOCUMENTS

| | | | |
|---|---|---|---|
| 5,305,836 A | 4/1994 | Holbrook et al. | |
| 5,321,981 A | 6/1994 | Macpherson | |
| 5,548,563 A | 8/1996 | Slevinsky | |
| 5,605,198 A | 2/1997 | Tibbitts et al. | |
| 5,608,162 A | 3/1997 | Ho | |
| 5,653,300 A | 8/1997 | Lund et al. | |
| 5,679,894 A | 10/1997 | Kruger et al. | |
| 5,699,246 A | 12/1997 | Plasek et al. | |
| 5,883,583 A | 3/1999 | Kishino | |
| 5,905,657 A | 5/1999 | Celniker | |
| 6,012,016 A | 1/2000 | Bilden et al. | |
| 6,021,859 A | 2/2000 | Tibbitts et al. | |
| 6,095,262 A | 8/2000 | Chen | |
| 6,109,368 A | 8/2000 | Goldman et al. | |
| 6,233,524 B1 | 5/2001 | Harrell et al. | |
| 6,276,465 B1 | 8/2001 | Cooley et al. | |
| 6,347,292 B1 | 2/2002 | Denny et al. | |
| 6,349,595 B1 | 2/2002 | Civolani et al. | |
| 6,353,799 B1 | 3/2002 | Meany et al. | |
| 6,408,953 B1 | 6/2002 | Goldman et al. | |
| 6,424,919 B1 | 7/2002 | Moran et al. | |
| 6,434,435 B1 | 8/2002 | Tubel et al. | |
| 6,519,568 B1 | 2/2003 | Harvey et al. | |
| 6,542,076 B1 | 4/2003 | Joao | |
| 6,542,077 B2 | 4/2003 | Joao | |
| 6,722,450 B2 | 4/2004 | Schultz et al. | |
| 6,722,453 B1 | 4/2004 | Crooks | |
| 6,732,052 B2 * | 5/2004 | Macdonald | E21B 44/005 702/6 |
| 6,745,159 B1 | 6/2004 | Todd et al. | |
| 6,785,641 B1 | 8/2004 | Huang | |
| 6,801,197 B2 | 10/2004 | Sanstrom | |
| 6,823,297 B2 | 11/2004 | Jenny et al. | |
| 6,836,731 B1 | 12/2004 | Whalley et al. | |
| 6,840,317 B2 | 1/2005 | Hirsch et al. | |
| 6,879,947 B1 | 4/2005 | Glass | |
| 6,892,812 B2 | 5/2005 | Niedermayr et al. | |
| 6,901,391 B2 | 5/2005 | Storm et al. | |
| 6,907,375 B2 | 6/2005 | Guggari et al. | |
| 6,944,547 B2 | 9/2005 | Womer et al. | |
| 6,980,929 B2 | 12/2005 | Aronstam et al. | |
| 6,980,940 B1 | 12/2005 | Gurpinar et al. | |
| 7,003,439 B2 | 2/2006 | Aldred et al. | |
| 7,020,597 B2 | 3/2006 | Oliver et al. | |
| 7,027,968 B2 | 4/2006 | Choe et al. | |
| 7,032,689 B2 | 4/2006 | Goldman et al. | |
| 7,035,778 B2 | 4/2006 | Goldman et al. | |
| 7,207,396 B2 | 4/2007 | Hall et al. | |
| 7,258,175 B2 | 8/2007 | Veeningen et al. | |
| 7,261,167 B2 | 8/2007 | Goldman et al. | |
| 7,286,959 B2 | 10/2007 | Steinke | |
| 7,357,196 B2 | 4/2008 | Goldman et al. | |
| 7,596,481 B2 | 9/2009 | Zamora et al. | |
| 7,653,563 B2 | 1/2010 | Veeningen et al. | |
| 7,693,695 B2 | 4/2010 | Huang et al. | |
| 7,757,781 B2 | 7/2010 | Hay et al. | |
| 7,810,584 B2 | 10/2010 | Haci et al. | |
| 7,899,658 B2 | 3/2011 | Oliver et al. | |
| 7,921,937 B2 | 4/2011 | Brackin et al. | |
| 8,145,462 B2 | 3/2012 | Foucault | |
| 8,204,697 B2 | 6/2012 | Garvey et al. | |
| 8,214,188 B2 | 7/2012 | Bailey et al. | |
| 8,296,114 B2 | 10/2012 | Prasad et al. | |
| 8,429,182 B2 | 4/2013 | Brackett et al. | |
| 8,560,365 B2 | 10/2013 | Friedlander et al. | |
| 8,589,136 B2 | 11/2013 | Ertas et al. | |
| 8,646,525 B2 | 2/2014 | Izgec et al. | |
| 8,688,426 B2 | 4/2014 | Al-Shammari | |
| 8,731,892 B2 | 5/2014 | Al-Shammari | |
| 8,818,729 B1 | 8/2014 | Stokeld et al. | |
| 8,854,373 B2 | 10/2014 | Pessier et al. | |
| 8,884,964 B2 | 11/2014 | Holl et al. | |
| 8,931,580 B2 | 1/2015 | Cheng et al. | |
| 8,968,197 B2 | 3/2015 | Friedlander et al. | |
| 8,996,396 B2 | 3/2015 | Benson et al. | |
| 9,022,140 B2 | 5/2015 | Marx et al. | |
| 9,026,417 B2 | 5/2015 | Sequeira et al. | |
| 9,057,258 B2 | 6/2015 | Benson | |
| 9,074,468 B1 | 7/2015 | Selman et al. | |
| 9,103,195 B2 | 8/2015 | Gawski et al. | |
| 9,157,309 B1 | 10/2015 | Benson et al. | |
| 9,181,794 B2 | 11/2015 | Oueslati et al. | |
| 9,223,594 B2 | 12/2015 | Brown et al. | |
| 9,249,654 B2 | 2/2016 | Strachan et al. | |
| 9,285,794 B2 | 3/2016 | Wang et al. | |
| 9,292,577 B2 | 3/2016 | Friedlander et al. | |
| 9,316,100 B2 | 4/2016 | Benson | |
| 9,359,882 B2 | 6/2016 | Snyder | |
| 9,404,307 B2 | 8/2016 | Maidla | |
| 9,404,356 B2 | 8/2016 | Benson et al. | |
| 9,436,173 B2 | 9/2016 | Wang et al. | |
| 9,462,604 B2 | 10/2016 | Das et al. | |
| 9,482,077 B2 | 11/2016 | Yeriazarian et al. | |
| 9,489,176 B2 | 11/2016 | Haugen | |
| 9,556,728 B2 | 1/2017 | De Reynal, Jr. | |
| 9,557,438 B2 | 1/2017 | Wessling et al. | |
| 9,587,478 B2 | 3/2017 | Moran et al. | |
| 9,593,558 B2 | 3/2017 | Sequeira et al. | |
| 9,593,566 B2 | 3/2017 | Hoehn et al. | |
| 9,595,129 B2 | 3/2017 | Cheng et al. | |
| 9,598,938 B2 | 3/2017 | Colvin et al. | |
| 9,613,413 B2 | 4/2017 | Hasselbusch et al. | |
| 9,638,032 B2 | 5/2017 | Rath et al. | |
| 9,646,271 B2 | 5/2017 | Friedlander et al. | |
| 9,733,388 B2 | 8/2017 | Holl et al. | |
| 9,784,099 B2 | 10/2017 | Kale et al. | |
| 9,874,648 B2 | 1/2018 | Braaksma et al. | |
| 9,875,535 B2 | 1/2018 | Finch et al. | |
| 9,886,674 B2 | 2/2018 | Friedlander et al. | |
| 9,958,571 B2 | 5/2018 | Al-Nuaim et al. | |
| 9,970,284 B2 | 5/2018 | Tang et al. | |
| 10,018,028 B2 | 7/2018 | Benson et al. | |
| 10,024,151 B2 | 7/2018 | Dykstra et al. | |
| 10,036,829 B2 | 7/2018 | Ghayour et al. | |
| 10,048,396 B2 | 8/2018 | Dobin et al. | |
| 10,087,721 B2 | 10/2018 | Usadi et al. | |
| 2002/0049575 A1 | 4/2002 | Jalali et al. | |
| 2002/0055868 A1 | 5/2002 | Dusevic et al. | |
| 2002/0103630 A1 | 8/2002 | Aldred et al. | |
| 2003/0074139 A1 | 4/2003 | Poedjono | |
| 2004/0046503 A1 | 3/2004 | Geusic | |
| 2004/0059554 A1 | 3/2004 | Goldman et al. | |
| 2004/0088115 A1 | 5/2004 | Guggari et al. | |
| 2004/0220790 A1 | 11/2004 | Cullick et al. | |
| 2004/0256152 A1 | 12/2004 | Dashevskiy et al. | |
| 2005/0063251 A1 | 3/2005 | Guidry et al. | |
| 2005/0121197 A1 | 6/2005 | Lopez et al. | |
| 2005/0133259 A1 | 6/2005 | Koederitz | |
| 2005/0149306 A1 | 7/2005 | King | |
| 2005/0197813 A1 | 9/2005 | Grayson | |
| 2005/0199425 A1 | 9/2005 | Estes et al. | |
| 2005/0217896 A1 | 10/2005 | Terentyev et al. | |
| 2005/0222772 A1 | 10/2005 | Koederitz et al. | |
| 2005/0273302 A1 | 12/2005 | Huang et al. | |
| 2005/0273304 A1 | 12/2005 | Oliver et al. | |
| 2005/0279532 A1 | 12/2005 | Ballantyne et al. | |
| 2005/0284661 A1 | 12/2005 | Goldman et al. | |
| 2006/0015310 A1 | 1/2006 | Husen et al. | |
| 2006/0100836 A1 | 5/2006 | Singh | |
| 2006/0149518 A1 | 7/2006 | Oliver et al. | |
| 2006/0151214 A1 | 7/2006 | Prange et al. | |
| 2006/0161406 A1 | 7/2006 | Kelfoun | |
| 2006/0247903 A1 | 11/2006 | Schottle et al. | |
| 2007/0185696 A1 | 8/2007 | Moran et al. | |
| 2007/0199721 A1 | 8/2007 | Givens et al. | |

(56) References Cited

U.S. PATENT DOCUMENTS

| | | |
|---|---|---|
| 2008/0133550 A1 | 6/2008 | Orangi et al. |
| 2008/0300793 A1 | 12/2008 | Tilke et al. |
| 2009/0132458 A1 | 5/2009 | Edwards et al. |
| 2009/0141943 A1 | 6/2009 | Liu |
| 2009/0159336 A1 | 6/2009 | Boone |
| 2010/0042327 A1 | 2/2010 | Garvey et al. |
| 2010/0133008 A1 | 6/2010 | Gawski et al. |
| 2010/0161292 A1 | 6/2010 | Shook et al. |
| 2010/0250139 A1 | 9/2010 | Hobbs et al. |
| 2010/0252325 A1 | 10/2010 | Porche |
| 2011/0024191 A1 | 2/2011 | Boone |
| 2011/0067119 A1 | 3/2011 | Baum |
| 2011/0067882 A1 | 3/2011 | Yeriazarian et al. |
| 2011/0108325 A1 | 5/2011 | Hartmann et al. |
| 2011/0153300 A1 | 6/2011 | Holl et al. |
| 2011/0172976 A1 | 7/2011 | Budiman et al. |
| 2012/0026002 A1 | 2/2012 | Vu et al. |
| 2012/0035896 A1 | 2/2012 | Wu et al. |
| 2012/0059521 A1 | 3/2012 | Iversen et al. |
| 2012/0123757 A1 | 5/2012 | Ertas et al. |
| 2012/0139747 A1 | 6/2012 | Papouras et al. |
| 2012/0143899 A1 | 6/2012 | Arango et al. |
| 2012/0147006 A1 | 6/2012 | Rothnemer |
| 2012/0272174 A1 | 10/2012 | Vogel et al. |
| 2012/0274664 A1 | 11/2012 | Fagnou |
| 2012/0316787 A1 | 12/2012 | Moran et al. |
| 2013/0032335 A1 | 2/2013 | Bennett |
| 2013/0087385 A1 | 4/2013 | Pena |
| 2013/0127900 A1* | 5/2013 | Pena .................. G06T 11/40 345/619 |
| 2013/0144531 A1 | 6/2013 | Johnston |
| 2013/0161096 A1 | 6/2013 | Benson et al. |
| 2013/0179136 A1 | 7/2013 | Tiwari et al. |
| 2013/0238508 A1 | 9/2013 | Kok et al. |
| 2013/0341093 A1 | 12/2013 | Jardine et al. |
| 2014/0000964 A1 | 1/2014 | Selman et al. |
| 2014/0040324 A1 | 2/2014 | Marcolino et al. |
| 2014/0070956 A1 | 3/2014 | Winkler et al. |
| 2014/0151121 A1 | 6/2014 | Boone et al. |
| 2014/0232723 A1 | 8/2014 | Jain et al. |
| 2014/0354402 A1 | 12/2014 | Joao |
| 2014/0362087 A1 | 12/2014 | Irani et al. |
| 2015/0014056 A1 | 1/2015 | White et al. |
| 2015/0053482 A1 | 2/2015 | Boone |
| 2015/0094994 A1 | 4/2015 | Sequeira et al. |
| 2015/0167454 A1 | 6/2015 | Kale et al. |
| 2015/0218914 A1 | 8/2015 | Marx et al. |
| 2015/0240618 A1 | 8/2015 | Gawski et al. |
| 2015/0285950 A1 | 10/2015 | Yarus et al. |
| 2015/0346908 A1 | 12/2015 | Huang et al. |
| 2015/0365635 A1 | 12/2015 | Jose et al. |
| 2016/0012371 A1 | 1/2016 | Passolt et al. |
| 2016/0017696 A1 | 1/2016 | Srinivasan et al. |
| 2016/0025877 A1 | 1/2016 | Ramfjord et al. |
| 2016/0117424 A1 | 4/2016 | Hohl et al. |
| 2016/0203681 A1 | 7/2016 | Nield et al. |
| 2016/0237802 A1 | 8/2016 | Boone et al. |
| 2016/0290117 A1 | 10/2016 | Dykstra et al. |
| 2016/0291575 A1 | 10/2016 | Moore et al. |
| 2016/0314225 A1 | 10/2016 | Gonzales et al. |
| 2016/0369621 A1* | 12/2016 | Salminen .............. E21B 44/00 |
| 2017/0096889 A1 | 4/2017 | Blanckaert et al. |
| 2017/0153358 A1 | 6/2017 | Hansen |
| 2017/0316128 A1 | 11/2017 | Huang et al. |
| 2018/0080305 A1 | 3/2018 | Jacks et al. |
| 2018/0119534 A1 | 5/2018 | Jamison et al. |
| 2019/0145183 A1 | 5/2019 | Potash |

FOREIGN PATENT DOCUMENTS

| | | |
|---|---|---|
| CN | 105917074 A | 8/2016 |
| EP | 2948618 B1 | 8/2018 |
| GB | 2346628 A | 8/2000 |
| GB | 2457604 A | 8/2009 |
| GB | 2534793 A | 8/2016 |
| GB | 2535039 A | 8/2016 |
| GB | 2535362 A | 8/2016 |
| GB | 2547592 A | 8/2017 |
| RU | 2640607 C1 | 1/2018 |
| WO | 95/21317 A2 | 8/1995 |
| WO | 2016/161291 A1 | 10/2016 |
| WO | 2017/164867 A1 | 9/2017 |
| WO | 2019/087213 A1 | 5/2019 |

OTHER PUBLICATIONS

NPL_441_2 Search Results, Jul. 23, 2021, 1 pp. (year: 2021).*

Dashevskiy et al., Application of Neural Networks for Predictive Control in Drilling Dynamics, SPE 56442, (1999), 9 pages.

Eronini et al., A Dynamic Model for Rotary Rock Drilling, Journal of Energy Resouces Technology, vol. 104, (Jun. 1982), 14 pages.

Glass, Kevin L., Apparatus and Method for Optimizing the Bit Design for a Well Bore, U.S. Appl. No. 60/163,227, filed Nov. 3, 1999.

Glowka, David A., Development of a Method for Predicting the Performance and Wear of PDC Drill Bits, Dandia Report, (Sep. 1987), 206 pages.

Glowka, David A., Use of Single-Cutter Data in the Analysis of PDC Bit Designs: Part 1 Development of a PDC Cutting Force Model, JPT, (Aug. 1989), pp. 797-849.

Glowka, David A., Use of Single-Cutter Data in the Analysis of PDC Bit Designs: Part 2 Development and Use of the PDCWear Computer Code, JPT, (Aug. 1989), pp. 850-859.

Hanson et al., Dynamics Modeling of PDC Bits, DPE/IADC 29401, (1995), pp. 589-604.

Ma et al., The Computer Simulation of the Interaction Between Roller Bit and Rock, SPE 29922, (1995), pp. 309-317.

Pessier et al., Quantifying Common Drilling Problems with Mechanical Specific Energy and a Bit-Specific Coefficient of Sliding Friction, Society of Petroleum Engineers, SPE 24584, (1992), pp. 373-388.

Pessier et al., Drilling Performance is a Function of Power at the Bit and Drilling Efficiency, SPE/IADC Drilling Conference and Exhibition (2012), 16 pages.

Curry et al., The Effect of Borehole Pressure on the Drilling Process in Salt, SPE/IADC Drilling Conference, (2005), pp. 1-8.

International Search Report for International Application No. PCT/US2019/014777 dated May 1, 2019, 3 pages.

International Written Opinion for International Application No. PCT/US2019/014777 dated May 1, 2019, 6 pages.

* cited by examiner

METHODS OF EVALUATING DRILLING PERFORMANCE, METHODS OF IMPROVING DRILLING PERFORMANCE, AND RELATED SYSTEMS FOR DRILLING USING SUCH METHODS

CROSS-REFERENCE TO RELATED APPLICATION

This application claims the benefit under 35 U.S.C. § 119(e) of U.S. Provisional Patent Application Ser. No. 62/620,918, filed Jan. 23, 2018, the disclosure of which is hereby incorporated herein in its entirety by this reference.

TECHNICAL FIELD

The present disclosure, in various embodiments, relates generally to systems and methods that may be used to monitor, evaluate, and improve drilling operations.

BACKGROUND

Oil and gas wells (wellbores) are usually drilled with a drill string. The drill string includes a tubular member having a drilling assembly that includes a single drill bit at its bottom end. The drilling assembly may also include devices and sensors that provide information relating to a variety of parameters relating to the drilling operations ("drilling parameters"), behavior of the drilling assembly ("drilling assembly parameters"), and parameters relating to the formations penetrated by the wellbore ("formation parameters"). A drill bit and/or reamer attached to the bottom end of the drilling assembly is rotated by rotating the drill string from the drilling rig and/or by a drilling motor (also referred to as a "mud motor") in the bottom hole assembly ("BHA") to remove formation material to drill the wellbore.

FIG. 1 illustrates an example of a conventional graphical user interface 10 displaying such information relating to drilling parameters, drilling assembly parameters, and formation parameters plotted as a function of measured depth and/or bit depth.

BRIEF SUMMARY

In some embodiments, a method for evaluating performance of a drilling operation comprises, during a drilling operation, receiving, at a control unit comprising a processor, a non-transitory memory, and a display, at least one performance parameter of at least one component of a drilling system measured by at least one sensor of the drilling system. At the processor, the at least one measured performance parameter is compared to at least one target performance parameter of the at least one component of the drilling system. The at least one target performance parameter comprises at least one performance parameter of a prior drilling operation measured under substantially similar drilling conditions and measured at at least one of substantially a same drilling depth relative to a total depth of the drilling operation and substantially a same depth relative to a total depth of a formation material layer. At the processor, a performance attribute value is determined by calculating a normalized, weighted average difference between the at least one measured performance parameter and the at least one target performance parameter. The performance attribute value is displayed on a graphical user interface of the display.

In additional embodiments, a method of improving performance of a drilling operation comprises, during a drilling operation, receiving, at a control unit comprising a processor, a non-transitory memory, and a display, at least one performance parameter of at least one component of a drilling system measured by at least one sensor of the drilling system. At the processor, the at least one measured performance parameter is compared to at least one target performance parameter of the at least one component of the drilling system. The at least one target performance parameter comprises at least one performance parameter of a prior drilling operation measured under substantially similar drilling conditions and measured at at least one of substantially a same drilling depth relative to a total depth of the drilling operation and substantially a same depth relative to a total depth of a formation material layer. At the processor, a performance attribute value is determined by calculating a normalized, weighted average difference between the at least one measured performance parameter and the at least one target performance parameter. At the processor, it is determined whether the performance attribute value is within a target performance attribute value range, and at least one drilling operating parameter is adjusted responsive to determining that the performance attribute value is not within the target performance attribute value range.

A system for drilling a subterranean wellbore, comprises a drilling assembly comprising a drill string and a drill bit, a sensor on the drill string, a sensor on the drill bit, and a control unit comprising a processor and a non-transitory memory device. The control unit is operatively coupled to the drilling assembly to receive at least one performance parameter from at least one of the sensor on the drill string or the sensor on the drill bit and to provide a control signal to adjust at least one drilling operating parameter of at least one of the drill string or the drill bit. The memory device stores an algorithm that, when executed by the processor, causes the control unit to compare the at least one measured performance parameter to at least one target performance parameter of at least one of the drill string or the drill bit. The at least one target performance parameter, which is stored by the memory device, comprises at least one performance parameter of a prior drilling operation measured under substantially similar drilling conditions and measured at substantially a same drilling depth, substantially a same depth percent, or substantially a same drilling time. The algorithm further causes the control unit to determine a performance attribute value by calculating a normalized, weighted average difference between the at least one measured performance parameter and the at least one target performance parameter, to determine whether the performance attribute value is within a target performance attribute value range, and to adjust the at least one drilling operating parameter responsive to a determination that the performance attribute value is not within the target performance attribute value range.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
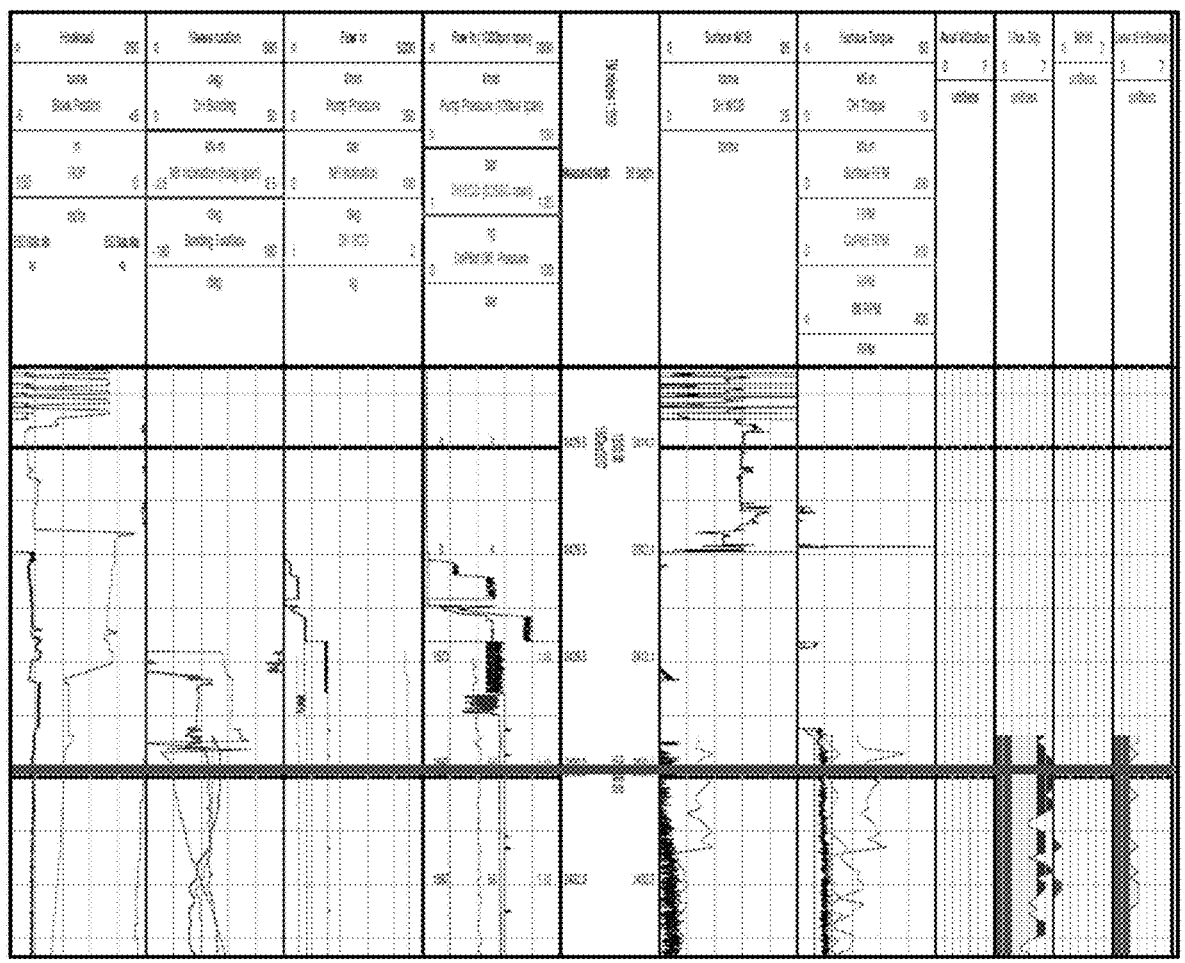
FIG. 1 is an illustration of a conventional graphical user interface employed in subterranean drilling operations.

The illustrations presented herein are not meant to be actual views of any particular system thereof, but are merely idealized representations, which are employed to describe embodiments of the present disclosure. For clarity in description, various features and elements common among the embodiments may be referenced with the same or similar reference numerals.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

Figure 2:
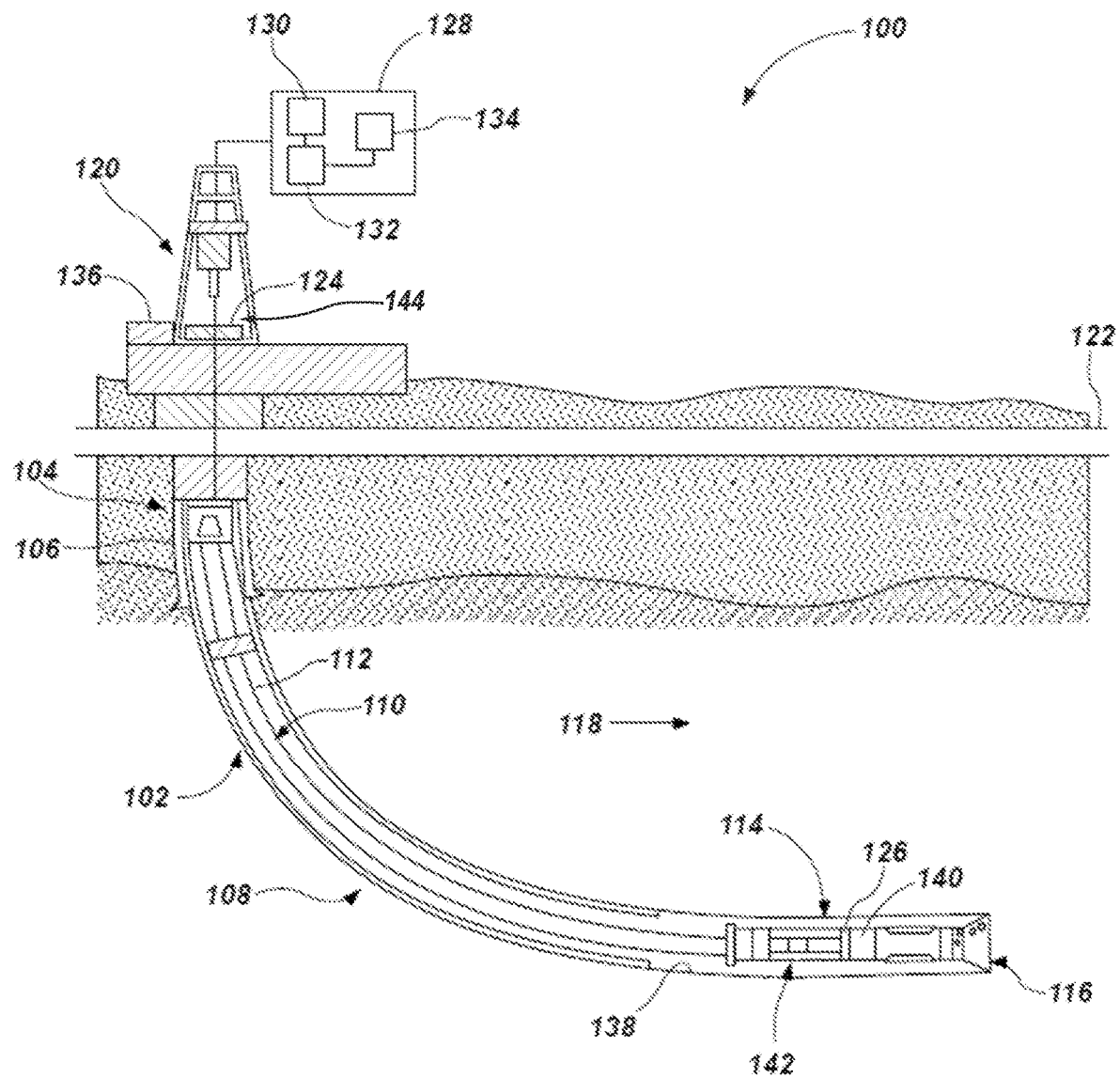
FIG. 2 is a schematic diagram of a drilling system according to embodiments of the present disclosure.

FIG. 2 is a schematic diagram of an example of a drilling system 100 that may utilize the apparatuses and methods disclosed herein for drilling boreholes. FIG. 2 shows a borehole 102 that includes an upper section 104 with a casing 106 installed therein and a lower section 108 that is being drilled with a drilling assembly 114. The drilling assembly 114 may include a crown block, traveling block, and hook supporting a drill string 110. The drill string 110 may include a tubular member 112 that carries a bottom hole assembly (BHA) at its bottom end. The tubular member 112 may be made up by joining drill pipe sections, or it may be a string of coiled tubing. A drill bit 116 may be attached to the bottom end of the drilling assembly 114 for drilling the borehole 102 of a selected diameter in a formation 118. During drilling, a drilling fluid from a source 136 thereof may be pumped under pressure through the tubular member 112, discharged at the bottom of the drill bit 116, and returns to the surface 122 via an annular space (also referred as the "annulus") between the drill string 110 and an inside sidewall 138 of the borehole 102.

The drill string 110 may extend to a rig 120 at surface 122. The rig 120 shown is a land rig 120 for ease of explanation. However, the apparatuses and methods disclosed herein equally apply when an offshore rig 120 is used for drilling boreholes under water. A rotary table 124 or a top drive may be coupled to the drill string 110 and may be utilized to rotate the drill string 110 and to rotate the drilling assembly 114, and thus the drill bit 116 to drill the borehole 102. A drilling motor 126 may be provided in the drilling assembly 114 to rotate the drill bit 116. The drilling motor 126 may be used alone to rotate the drill bit 116 or to superimpose the rotation of the drill bit 116 by the drill string 110. The rig 120 may also include conventional equipment, such as a mechanism to add additional sections to the tubular member 112 as the borehole 102 is drilled.

A control unit 128, which may be a computer-based unit, may be placed at the surface 122 for receiving and processing downhole data transmitted by sensors 140 provided at the drill bit 116, sensors 142 provided along the drill string 110, and sensors 144 provided at the surface 122 and for controlling selected operations of the various devices of the drilling system 100.

The sensors 140 of the drill bit 116 may include one or more sensors that provide information relating to drilling parameters of the drill bit 116 in the subterranean formation 118 including, but not limited to, weight-on-bit (WOB), torque rotational speed of the drill bit 116 (revolutions per minute or RPM), rate of penetration (ROP) of the drill bit 116 into the formation 118, pressure, temperature, mechanical specific energy, and differential pressure. The sensors 140 may include one or more sensors that provide information relating to interactions of the drill bit 116 with the formation 118 including vibration, bit whirl, bit wobble, bit walk, stick-slip, oscillation, strain, and acceleration. The sensors 140 may also include one or more sensors that provide information relating to the drilling operations (e.g., operating parameters). The sensors 140 of the drill bit 116 may also include one or more sensors that provide information relating to the formation 118 penetrated by the drilling assembly 114 (e.g., formation parameters) including sensors generally known as measurement-while-drilling (MWD) sensors or logging-while-drilling (LWD) sensors for measuring lithology, permeability, porosity, rock strength, and other geological characteristics of the formation 118 surrounding the borehole 102. The sensors 140 of the drill bit 116 may also include one or more sensors that provide information relating to a position and orientation of the drill bit 116 including, but not limited to, tool face angle, or azimuth, and inclination. The sensors 140 may also include one or more sensors that provide information relating to drilling fluid flow in the drilling assembly 114 including, but not limited to, flow rate of drilling fluid through the drill bit 116, fluid pressure internal to the drill bit 116, fluid pressure external to the drill bit 116, fluid impedance, and fluid turbidity. The sensors 140 of the drill bit 116 may also include one or more sensors that may determine a position of a cutting element on the drill bit 116 including, but not limited to, depth of cut, exposure, and inclination angle (e.g., back rake angle, side rake angle). The sensors 140 of the drill bit 116 may also include sensors that provide any relevant time values needed to process signals providing information relating to the drill bit design, drilling parameters, formation parameters, and the like described above.

The sensors 142 of the drill string 110 may include one or more sensors that provide information relating to drilling parameters of the drill string 110 in the subterranean formation 118 including, but not limited to, WOB, torque, rotational speed of the drill string 110 (RPM), ROP of the drill string 110, pressure, differential pressure, temperature, mechanical specific energy, and power. The sensors 142 may include one or more sensors that provide information relating to the behavior of the drill string 110 with the formation 118 including vibration, oscillation, strain, and acceleration. The sensors 142 may also include one or more sensors that provide information relating to the formation 118 penetrated by the drilling assembly 114 (e.g., formation parameters) including MWD and/or LWD sensors. The sensors 142 may also include one or more sensors that provide information relating to a position and orientation of the drill string 110 including, but not limited to, azimuth, inclination, and bending moment. The sensors 142 may also include one or more sensors that provide information relating to drilling fluid flow in the drill string 110 including, but not limited to, flow rate of drilling fluid through the drill string 110, fluid pressure internal to the drill string 110, fluid pressure external to the drill string 110, fluid impedance, and fluid turbidity. The sensors 142 may also include sensors that provide any relevant time values needed to process signals providing information relating to the drill string 110 design, drilling parameters, formation parameters, and the like described above.

The sensors 144 located at the surface 122 may include one or more sensors that provide information relating to the drilling parameters including, but not limited to, WOB, TOB, hook load, rotational speed of the drill string 110 and drill bit 116 (RPM), rate of penetration (ROP) of the drill string 110 and drill bit 116, power, pressure, and temperature. The sensors 144 may also include one or more sensors that provide information relating to drilling fluid flow in the drilling assembly 114 including, but not limited to, pump rate and/or flow rate of drilling fluid through the drilling assembly 114 and properties of the drilling fluid including, but not limited to, density, pH, viscosity, clarity, compressibility, pressure, temperature, and composition. The sensors 144 may also include one or more sensors that provide information relating to a composition of cuttings and drilling fluid, such as the presence hydrocarbon gases, returned from the borehole 102 in the drilling fluid during drilling operations.

In some embodiments, the control unit 128 may include a processor 130, a non-transitory memory 132 (or a computer-readable medium), and a display 134. The control unit 128 may control the operation of (e.g., is operatively coupled to) one or more devices of the drilling assembly 114 and sensors 140, 142, 144. The memory 132 may contain one or more databases storing information, algorithms, software, and the like as described herein. The memory 132 may be any suitable device, including, but not limited to, a read-only memory (ROM), a random-access memory (RAM), a flash memory, a magnetic tape, a hard disk, and an optical disk, or a combination of two or more memory types. The processor 130 may process data received from sensors 140, 142, 144, control downhole devices and sensors 140, 142, 144, and communicate data (e.g., signals) with the control unit 128 via a two-way telemetry unit. The processor 130 may be any suitable device, such as a general purpose processor or microprocessor or a custom processor or microprocessor, configured to execute algorithms to perform a method described with reference to FIG. 4.

Figure 3:
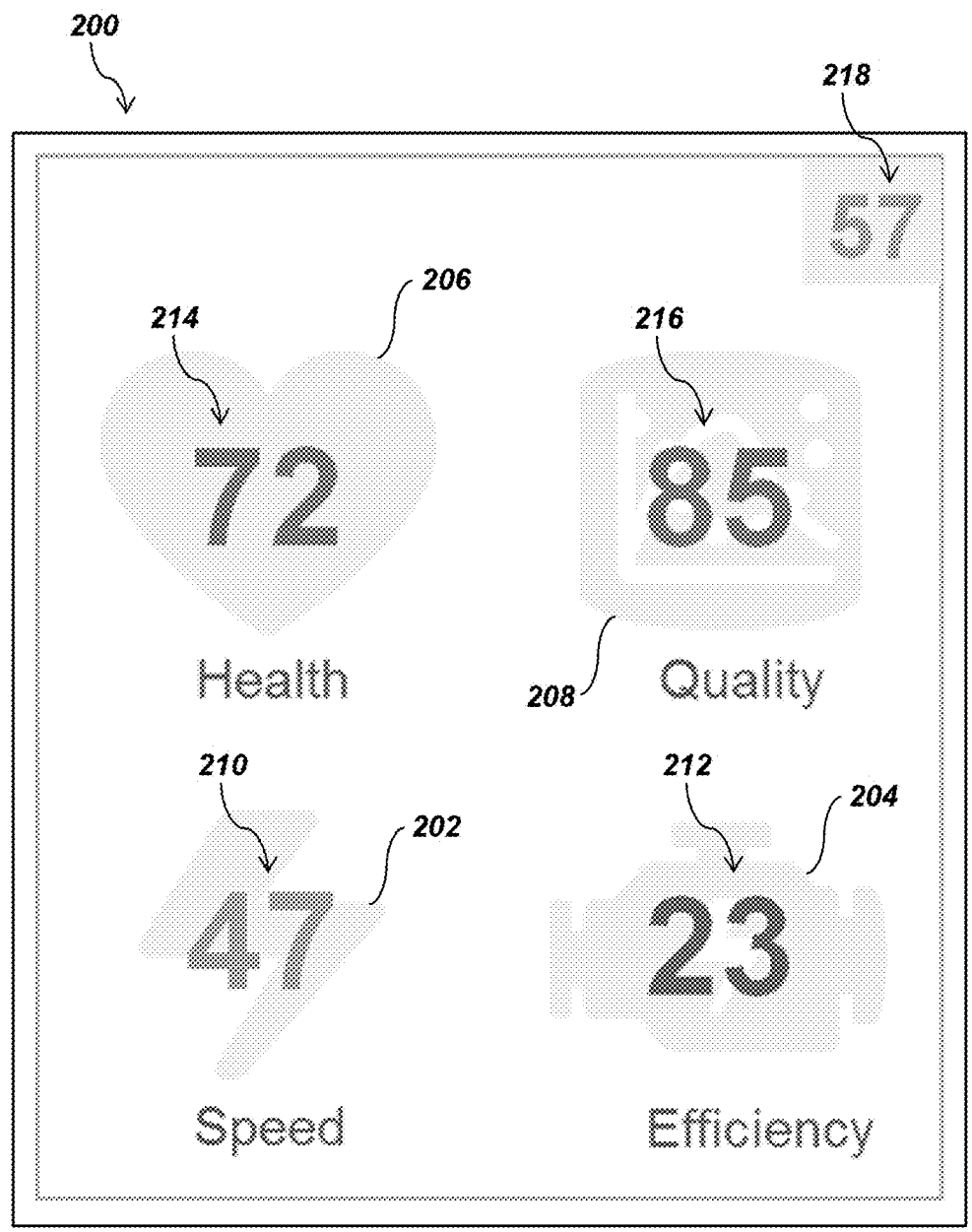
FIG. 3 is a graphical user interface according to embodiments of the present disclosure.

FIG. 3 is a graphical user interface (GUI) screen 200 that may be displayed on the display 134 according to some embodiments of the present disclosure. The GUI screen 200 includes at least one performance attribute graphic and associated performance attribute value. Each performance attribute value provides an evaluator presented with the GUI screen 200 with a measure (e.g., grade) of a quality of a present drilling operation compared to a target drilling operation. In some embodiments, the GUI screen 200 may include a speed graphic 202, an efficiency graphic 204, a health graphic 206, and a quality graphic 208. Each graphic may be associated with a speed value 210, an efficiency value 212, a health value 214, and a quality value 216, respectively. The GUI screen 200 may also include a cumulative value 218.

The speed value 210 provides a measure of a rate at which the drilling operation is completed by the drilling assembly 114 as compared to a target rate at which the drilling operation could be completed.

The efficiency value 212 provides a measure of efficiency, such as mechanical specific energy and/or hole cleaning efficiency, of the drilling operation to a target efficiency at which the drilling operation could be complete.

The health value 214 provides a measure of susceptibility of the drilling assembly 114 to damage caused by undesirable interaction of the drilling assembly 114 with the formation material. For example, during drilling operation, the drill bit 116 and/or the drill string 110 may interact with the formation 118 such that the rotational speed of the drill bit 116 and/or the drill string 110 fluctuates, the drill bit 116 and/or drill string 110 vibrates and/or oscillates, the drill bit 116 and/or drill string 110 is excessively or ineffectively forced into the formation 118, the drill bit 116 bounces off a bottom of the borehole 102, and/or excessive heat or pressure is generated at the drill bit 116 and/or drill string 110. Such interactions may cause damage to the drilling assembly 114, including the drill bit 116 and/or the drill string 110, which may result in ineffective and inefficient drilling of the formation 118.

The quality value 216 provides a measure of conformity of the drilling path of the drilling operation to a planned drilling path. In some embodiments, additional performance attribute values may be included on the GUI screen 200.

Additional performance attribute values may include a fracability value, a producibility value, a hazard mitigation value, and/or an economics value. The fracability value provides a measure of a susceptibility of the formation material to fracking. The producibility value provides a measure of a quality and/or quantity of hydrocarbon production during the drilling operation. The hazard mitigation value provides a measure of an amount of corrective action required during drilling operation such as in response to the undesirable interaction of the drilling assembly 114 with the formation material as described with reference to the health value 214. The economics value provides a measure of the cost of the drilling operation. The cumulative value 218 may provide a measure of an overall or comprehensive quality of the drilling operation taking into consideration one or more of any of the foregoing performance attribute values and taking into consideration that some of the performance attributes have a greater effect on drilling performance than other performance attributes. The GUI screen 200 may be displayed and the values 210-218 may be determined in a method described with reference to FIG. 4.

Figure 4:
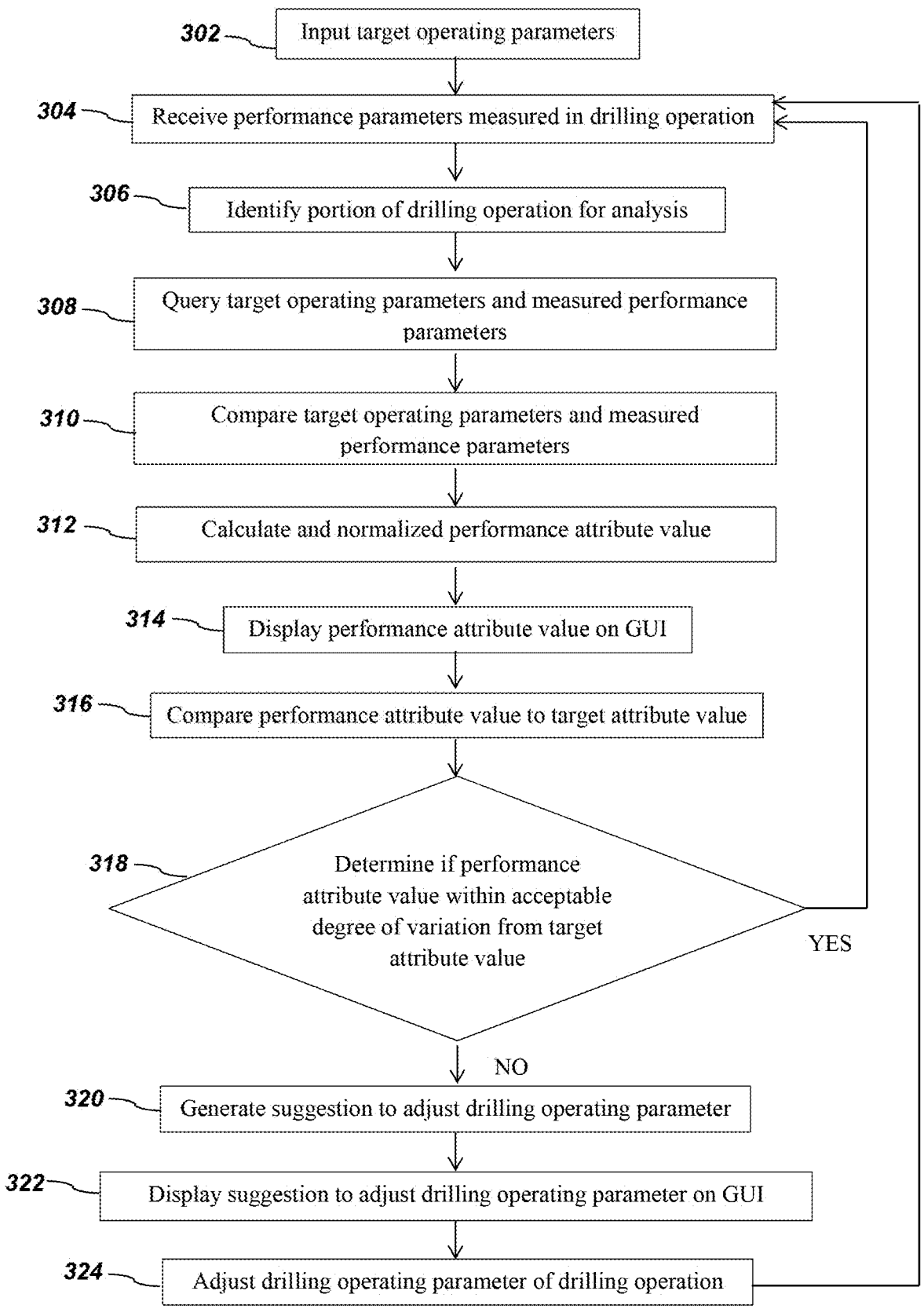
FIG. 4 is a process flow chart illustrating actions performed by a method according to embodiments of the present disclosure.

FIG. 4 is a process flow chart illustrating activities that may be performed by the control unit 128 in a method of evaluating performance of a drilling operation. In action 302, the memory 132 is provided with and stores information relating to a planned drilling operation. Information relating to the drilling operation, which is collectively referred to herein as "target operating parameters," may include, but is not limited to, formation parameters, drilling parameters, design of the drilling assembly 114, and other operating parameters as previously described herein. In some embodiments, action 302 may occur prior to commencing drilling operations. In other embodiments, action 302 may occur concurrently with drilling operations.

Information relating to formation parameters may include a location (e.g., geological location and basin) of the drilling system 100 where drilling operations are conducted and with respect to such location, a type, sequence, location relative to the surface 122, and expanse, and properties of each formation material of the subterranean formation 118 along a planned drilling path of the drilling operation such as lithology, porosity, rock strength, and other geological characteristics. The formation parameters may be identified through research, empirical studies, computer generated models and simulations, technical records relating to prior drilling operations in the same or substantially the same formation materials, etc. Information relating to the formation parameters may be logged and stored as a function of true vertical depth, measured depth, percentage drilled relative to a total depth of the drilling operation, percentage drilled relative to a total depth of a given formation material layer of a plurality of formation material layers within the subterranean formation 118, and/or drilling time in the memory 132.

Drilling parameters provided to the control unit 128 may include parameters of a well plan. The well plan may include a planned drilling path including trajectory, shape, orientation (e.g., vertical, horizontal, and/or curved), depth, diameter, etc. Information relating to the trajectory, shape, and orientation of the planned drilling path may include whether the borehole to be drilled will be or include a surface wellbore segment, a vertical wellbore segment, a curved wellbore segment, or a lateral wellbore segment, and, the respective depths of any such wellbore segments. Information relating to the trajectory, shape, and orientation of the planned drilling path may further include the build-up rate (BUR) of any curved wellbore segment and/or kickoff point of any curved wellbore segment.

Parameters of the drilling assembly 114 design may include information relating to the components of the drilling assembly 114. Information relating to the components of the drilling assembly 114 design may include whether the drilling assembly 114 comprises a directional drilling system or a straight hole drilling system, whether the drilling assembly 114 includes a downhole hydraulic motor, whether the drilling assembly 114 includes an adjustable kick off (AKO) sub, and whether the drilling system will include a rotary steerable system (such as the AutoTrak Curve Rotary Steerable System (ATK) available from Baker Hughes, a Ge company, of Houston, Tex.). Information relating to the drilling assembly 114 design may also include parameters of components of the drilling assembly 114 such as, but not limited to, size (e.g., diameter), location, and orientation of the components. Information relating to drill bit 116 design parameters may include, but is not limited to, aggressiveness, size (e.g., gage diameter) and number of blades, size and number of cutting elements, location and orientation of the cutting elements, number, location, and orientation of fluid nozzles, and presence of other features such as wear knots, depth-of-cut control features, and the like.

Information relating to the operating parameters may include a planned rotational speed of the drill bit 116 and/or of the drill string 110, a planned ROP of the drill bit 116, a planned WOB, and a planned torque. Information relating to the operating parameters may further include drilling fluid flow parameters such as the pressure at which drilling fluid is pumped through the drill string 110 and/or the flow rate of drilling fluid through the drill bit 116 and/or the drill string 110. Information relating to the operating parameters may further include information relating to a crew performing drilling operations. The target operating parameters may also include information relating to prior performance of a drilling system having at least one of substantially the same the drilling assembly 114 design, substantially the same formation parameters, and substantially the same operating parameters.

In action 304, information relating to formation parameters, drilling parameters, and other operating parameters, which may be collectively referred to as "performance parameters," measured during a drilling operation may be received from at least one component of the drilling system 100 at the control unit 128. In some embodiments, information relating to the performance parameters is measured by the sensors 140, 142, 144, received by the control unit 128, and stored in the memory 132 during the drilling operation. The performance parameters may be received and stored as a function of location, such as true vertical depth, measured depth, percentage drilled relative to a total depth of the drilling operation, percentage drilled relative to a total depth of a given formation material layer of a plurality of formation material layers within the subterranean formation 118, and/or drilling time. Information provided by the sensors 140, 142, 144 has been previously described herein.

In action 306, a portion of the drilling operation for which at least one of the plurality of performance attribute values are to be calculated is identified. The portion of the drilling operations to be analyzed may be identified as a function of at least one of drilling depth and drilling time. In some embodiments, the portion of the drilling operation to be analyzed may be preset. For example, analysis of the drilling operation may be conducted after a given interval of drilling time has elapsed such as 5 minutes, 30 minutes, 60 minutes, or any other time interval. In other embodiments, analysis of the drilling operation may be conducted after a given drilling depth has been reached. For example, analysis of the drilling operation may be conducted in intervals of 50 feet, 100 feet, or any other distance interval or in intervals of 1%, 2%, 5%, 20%, etc. of a total drilling depth or of the drilling depth of a given formation material layer within the subterranean formation 118.

In action 308, the target performance parameters provided in action 302 and the measured performance parameters provided in action 304 are queried for the portion of drilling operations identified in action 306. In action 310, the measured performance parameters are compared to the target performance parameters. The target performance parameters to which the measured performance parameters are compared may vary depending on which performance attribute values is being calculated. For any given performance attribute, some information provided in action 302 and data measured in action 304 may affect the selected performance attribute, while others may not. Additionally, the degree to which the parameters affect the performance attribute may vary between the different parameters. Accordingly, the information queried for each performance attribute category may vary.

For the speed value 210, information queried in action 308 may include information relating to, but not limited to, ROP, RPM, drill bit 116 aggressiveness, and accumulated drilling time. For the efficiency value 212, information queried in action 308 may include information relating to, but not limited to, WOB, ROP, RPM, depth-of-cut, power, rock strength, friction, motor differential pressure, mechanical specific energy, and hole cleaning efficiency.

For the health value 214, information queried in action 308 may include, information relating to, but not limited to, vibrations, stick slip, temperature, RPM, bending moment, WOB, power, and mechanical specific energy.

For the quality value 216, information queried in action 308 may include information relating to, but not limited to, orientation of the drilling assembly 114, including inclination and bending moment, build-up rate, presence of doglegs, drilling time, quantity and quality of drilling path corrections, slide drilling, and rotational drilling.

For the fracability value, information queried in action 308 may include, but is not limited to, location of the drilling assembly 114 relative to target fracking location, such as location in the subterranean formation with pre-identified as susceptible to fracking, and other formation material properties.

For the producibility value, information queried in action 308 may include, but is not limited to, location of the drilling assembly 114 relative to target production location, such as location in the subterranean formation with pre-identified producing formation, and other formation material properties.

For the hazard mitigation value, information queried in action 308 may include, but is not limited to, location of the drilling assembly 114 and, more particularly, location of the drilling assembly 114 relative to target production location and/or relative to regions of the subterranean formation with a known propensity for damage to the drilling assembly 114 or known propensity to retard drilling operation. Potential hazards include, but are not limited to, circulation loss (e.g., loss of drilling fluid to a formation), stuck pipe, and transition between formation materials.

For the economics value, information queried in action 308 may include, but is not limited to, fixed costs and variable costs. Fixed costs may include, but are not limited to, drilling equipment costs, required personnel and associated salaries, and regulatory costs. Variable costs may include, but are not limited to, drilling time, or duration, energy input, drilling operation downtime, drilling operation repair time, replacement and repair costs, and the like.

In action 312, at least one of the plurality of performance attribute values is calculated and normalized. The performance attribute value is a measure of variation of the measured performance parameter relative to the target performance parameter. The performance attribute value is indicative of a standard of performance of the drilling operation. For example, the performance attribute value indicates whether the drilling operation is being enhanced or deterred by one or more performance parameters of one or more components of the drilling system 100. The performance attribute values may be determined at least in part by a ratio, fraction, or percentage difference between the measured performance parameter and the target performance parameter. Each performance attribute value may be based on a plurality of measured performance parameters and may be compared to a plurality of target performance parameters. Furthermore, the effect of any of the measured performance parameters for a given performance attribute value on drilling performance may vary relative to another measured performance parameter. Accordingly, the performance attribute value may be a weighted average of the difference between the plurality of measured performance parameters and the plurality of target performance parameters.

The performance attribute values may be normalized on a scale. By way of non-limiting example, the performance attribute values may be normalized on a scale of 0-100. In some embodiments, high values (e.g., top quartile of 75-100) may indicate an acceptable performance attribute value, while median values (e.g., median quartiles of 25-74) and low values (e.g., bottom quartile of 0-24) may indicate an unacceptable performance attribute value. By way of non-limiting example, it may be desirable to conduct drilling operations as quickly and efficiently as possible represented by a high speed value 210 and high efficiency value 212. In other embodiments, median and low values may indicate an acceptable performance attribute value. By way of non-limiting example, it may be desirable to conduct drilling operations such that the measured drilling path follows the planned drilling path as closely as possible represented by a low quality value 216.

In action 314, at least one performance attribute value calculated in action 312 is displayed on a graphical user interface. In some embodiments, the performance attribute value is displayed on the GUI screen 200 illustrated in FIG. 3. In other embodiments, the performance attribute value is displayed on a GUI screen such as any of the GUIs illustrated in FIGS. 5-8. Referring to FIGS. 3 and 4, in some embodiments, the performance attribute values 212-218 displayed on the GUI screen 200 may be color coded. The color coding may provide an evaluator presented with the GUI with an indication as to whether the performance attribute values 212-218 are acceptable or unacceptable values. For example, the performance attribute value may be displayed in green if the performance attribute value is an acceptable value and displayed in yellow and/or red if the performance attribute value is an unacceptable value. The degree (e.g., severity) to which the performance attribute value is unacceptable may determine whether the performance attribute value is displayed in yellow or red. An acceptable value is indicative of an acceptable standard of performance of the drilling system 100 during the drilling operation such that the drilling operation is meeting at least minimum performance requirements and/or is enhanced by one or more performance parameters of one or more components of the drilling system 100. An unacceptable value is indicative of an unacceptable standard of performance of the drilling system 100 during the drilling operation such that the drilling operation is not meeting at least minimum performance requirements or is deterred by one or more performance parameters of one or more components of the drilling system 100.

With continued reference to FIGS. 3 and 4, the GUI screen 200 and other GUI screens illustrated in FIGS. 5-8 provide a characterization of drilling operations that takes into consideration the complex interplay of surface applied operating parameters and the dynamic downhole drilling environment. The factors and variables affecting performance of a drilling operation are innumerable and involve a complex and reactive relationship between surface applied operating parameters, the downhole drilling environment, and the downhole drilling assembly. Some such factors and variables have been discussed herein with reference to the information received in actions 302 and 304 and queried in action 308. While the GUI screen 10 of the prior art provides actual measurements of surface applied and/or downhole measured operating parameters, the GUI screen 10 does not provide the evaluator, such as a drilling system operator or driller, with any characterization of how these operating parameters are affecting the effectiveness of the overall drilling operation or one or more attributes of the drilling operation. On the other hand, the GUI screen 200 and other GUI screens illustrated in FIGS. 5-8 provide a characterization of multiple performance attributes of the drilling operation taking into consideration the complex interplay of surface applied operating parameters, the downhole drilling environment, and the downhole drilling assembly. Further, by providing such a characterization, drilling operations can be selectively tailored to drilling objectives. For example, a drilling operation may be selectively tailored such that the drilling operations are conducted as quickly as possible (e.g., high speed value 210) at the expense of quality of the borehole formation (e.g., high quality value).

Furthermore, in drilling operations, drillers commonly rely on their experience with a given drilling assembly to estimate steering and otherwise control drilling operations. However, the ability of a driller to accurately and efficiently control drilling operations is highly subjective to the driller's familiarity with the drilling assembly, the drilling path, the formation material(s) being drilled through, and other operating parameters. Furthermore, as previously discussed, the complexity of the interaction of surface applied operating parameters in a dynamic downhole drilling environment makes selective tailoring of the drilling operation a difficult process. For example, an adjustment of one surface operating parameter, such as applied WOB, can have an effect on multiple performance attribute values, as previously discussed with respect to action 308. Accordingly, the incorrect application of one or more surface operating parameters can exacerbate suboptimal drilling. The GUI screens of FIGS. 4-8 represent a comprehensive and holistic evaluation of the drilling operating parameters, the downhole drilling environment, and the downhole drilling assembly into a normalized (e.g., customized, scaled) performance attribute value. In some embodiments, the evaluator presented with any of the GUI screens of FIGS. 4-8 may more intuitively and accurately make an assessment of whether the drilling operation is performing better than, worse than, or the same as prior drilling operations. In other embodiments, the evaluator presented with any of the GUI screens of FIGS. 4-8 may more intuitively and accurately make an assessment of whether the drilling operation is performing better than, worse than, or the same as an intended/planned drilling operation. In additional embodiments, the evaluator presented with any of the GUI screens of FIGS. 4-8 may more intuitively and accurately make an assessment of whether one or more drilling operation parameters should be altered to improve drilling operations. In yet further embodiments, the evaluator presented with any of the GUI screens of FIGS. 4-8 may more intuitively and accurately make an assessment of whether altering one or more drilling operation parameters improved or deterred the drilling operation. Accordingly, the systems, methods, and GUI screens of the disclosure facilitate improved real-time manual control of the drilling system by an evaluator.

In addition to manual drilling operations, the systems and methods of the disclosure facilitate improved real-time automated control of the drilling system based on a comprehensive and holistic evaluation of the drilling operation parameters such that drilling operations are assessed to determine whether the drilling operation is performing better than, worse than, or the same as prior drilling operations. The drilling operations may be further assessed to determine whether the drilling operation is performing better than, worse than, or the same as an intended/planned drilling operation. Additionally, the controller of the drilling system may more accurately and intuitively assess whether one or more drilling operation parameters should be automatically altered to improve drilling operations, and/or such that the controller may more accurately and intuitively assess whether altering one or more drilling operation parameters improved or deterred the drilling operation.

In order to address the foregoing problems, FIG. 4 further illustrates a method of improving performance of a drilling operation responsive to calculating the performance attribute value calculated in action 312 and displayed in action 314. In action 316, the performance attribute value calculated in action 312 is compared to a target performance attribute value. In action 318, the performance attribute value is determined to be equal to or within an acceptable or unacceptable degree of variation from the target performance attribute value.

The process may continue to action 320 if the performance attribute value is determined to be within an unacceptable degree of variation from the target performance attribute value. In action 320, a suggestion to adjust at least one drilling operating parameter is determined to improve the drilling operation relative to at least one performance attribute value that has been calculated without negatively affecting other performance attribute values. In other words, the at least one drilling operating parameter adjustment is selected such that upon repeating actions 304-318, the performance attribute value will be equal to or within the acceptable degree of variation from the target performance attribute value. One or more performance parameters may be dependent upon one another such that variation of one performance parameter may necessitate automatic variation(s) of another performance parameter. Accordingly, in some embodiments, the suggestion to adjust at least one drilling operating parameter is determined to improve (e.g., enhance) the drilling operation relative to multiple performance attribute values. In other embodiments, the suggestion to adjust at least one drilling operating parameter is determined to improve the drilling operation relative to one or more performance attribute values while deterring the drilling operation relative to another performance attribute value.

For example, suggestions to improve the speed value 210 may include a suggestion to increase or decrease at least one of WOB, RPM, ROP, torque, and differential pressure. Suggestions to improve the efficiency value 212 may include a suggestion to increase or decrease at least one of WOB, RPM, ROP, torque, and differential pressure and/or to adjust a configuration of the drilling assembly 114.

Suggestions to improve the health value 214 may include a suggestion to increase or decrease at least one of WOB, RPM, ROP, TOB, and differential pressure, to pull the drill string 110 away from a bottom of the borehole 102, and/or to adjust a configuration of the drilling assembly 114.

Suggestions to improve the quality value 216 may include a suggestion to increase or decrease at least one of WOB, RPM, ROP, TOB, and differential pressure, to adjust a configuration of the drilling assembly 114, to adjust an orientation of the drill bit 116 face, and/or to adjust a drilling methodology, such as from slide drilling to rotational drilling and vice versa.

Suggestions to improve the fracability value may include a suggestion to adjust a trajectory of drilling and/or to adjust a configuration of the drilling assembly 114.

Suggestions to improve the producibility value may include a suggestion to adjust a trajectory of drilling and/or to adjust a configuration of the drilling assembly 114.

Suggestions to improve the hazard mitigation value may include a suggestion to increase or decrease at least one of WOB, RPM, ROP, TOB, and differential pressure, to adjust a configuration of the drilling assembly 114, to adjust an orientation of the drill bit 116 face, to adjust a drilling methodology, such as from slide drilling to rotational drilling and vice versa, and/or to cease drilling operations so as to avoid interactions of the drilling assembly 114 with the subterranean formation 118 known to retard drilling operations, and/or to adjust a trajectory of drilling and/or to adjust a configuration of the drilling assembly 114 so as to avoid a region of the subterranean formation 118 with a known propensity for damage to the drilling assembly 114 or known propensity to retard drilling operation.

Suggestions to improve the economics value may include a suggestion to increase or decrease at least one of WOB, RPM, ROP, torque, and differential pressure, to adjust a configuration of the drilling assembly 114, and/or to replace at least one component of the drilling assembly 114.

Figure 6:
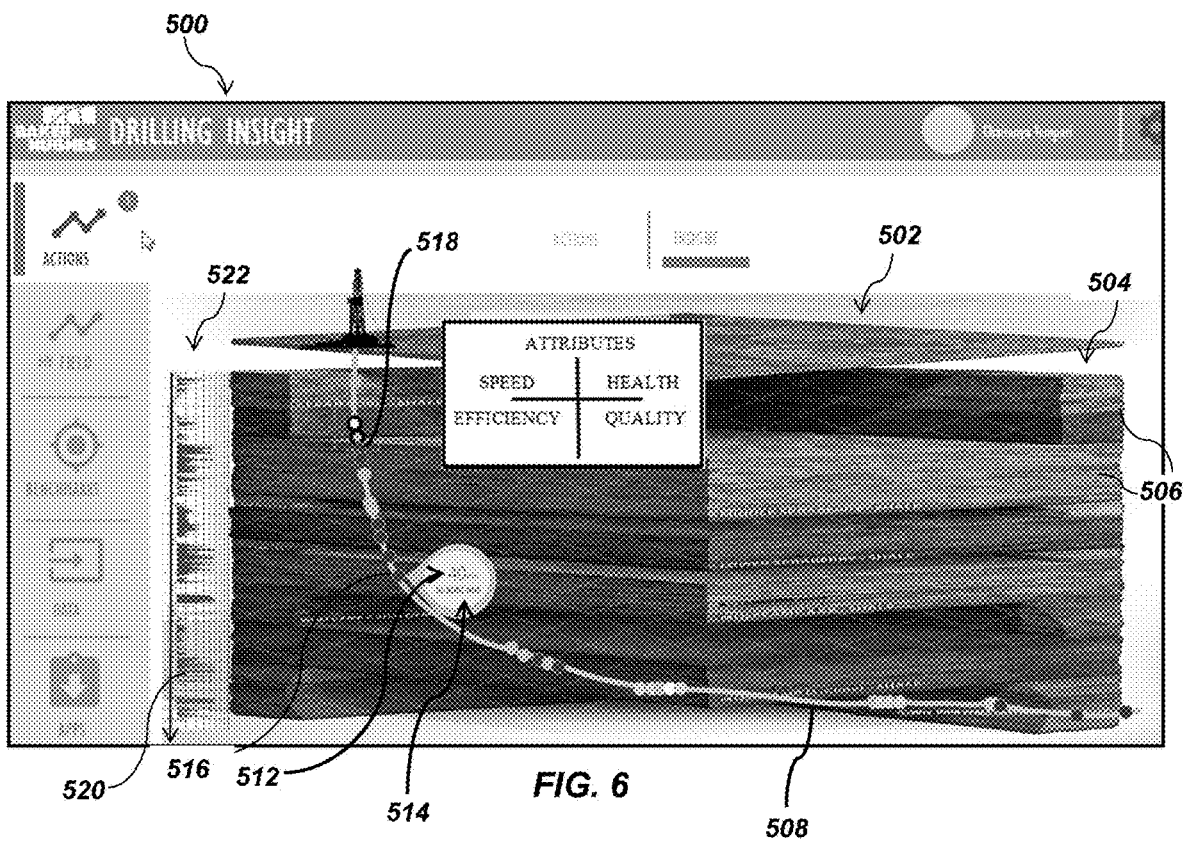

In action 322, the suggestion is displayed on a graphical user interface, such as the graphical user interface illustrated in FIG. 6. In action 324, the at least one operating parameter adjustment is applied to the drilling operation using the control unit 128. The control unit 128 provides a control signal to adjust at least one drilling operating parameter to at least one component of the drill system In some embodiments, the at least one operating parameter adjustment may be manually applied by the evaluator presented with the suggestion. In other embodiments, the at least one operating parameter adjustment may be automatically applied by the control unit 128.

The methods of evaluating performance and/or improving performance of the drilling operation may be repeated on an ongoing basis. For example, analysis of the drilling operation including actions 302-324 may be repeatedly conducted after a particular time interval has elapsed such as every 5 minutes, every 30 minutes, every hour, or any other time interval. In other embodiments, analysis of the drilling operation may be completed after a given distance of the borehole 102 or a given depth percentage has been reached. For example, analysis of the drilling operation may be repeatedly conducted in intervals of 50 feet, 100 feet, or any other distance interval or in intervals of 1%, 2%, 5%, etc. of the total drilling depth or of the drilling depth of a given formation material layer within the subterranean formation 118.

The methods of evaluating performance and/or improving performance of the drilling operation may also be conducted after the drilling operation is complete. For example, during drilling, the measured performance parameters, the suggestions to change at least one drilling operating parameter, and the response to changing the operating parameter may be recorded and used to improve the accuracy and sophistication of the process in identifying and selecting desirable suggestions. As the information in the memory 132 increases, and the algorithms executed by the processor 130 become more sophisticated and accurate in identifying and selecting adjustments to the drilling operation parameters, the information and knowledge acquired therefrom may be used to improve drilling operations. In addition, at any point, knowledge gaps may be identified and additional testing and analysis may be performed to improve the accuracy and sophistication of the process in identifying and selecting desirable drilling operation parameters. Post-drilling analysis may provide information to close such knowledge gaps.

Figure 5:
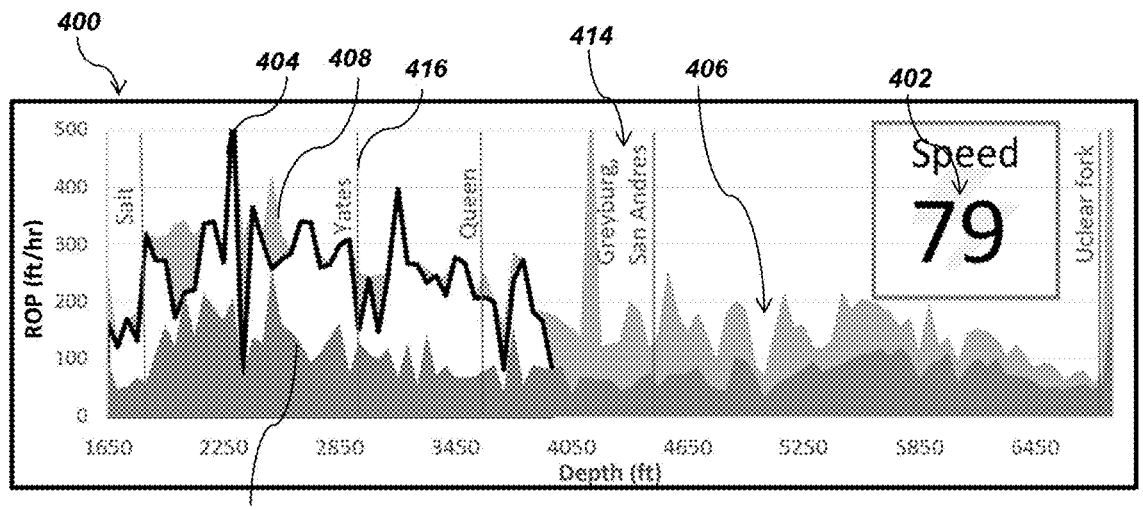
FIGS. 5-8 are graphical user interfaces according to embodiments of the present disclosure.

FIG. 5 is a GUI screen 400 according to some embodiments of the present disclosure. The GUI screen 400 comprises a performance attribute value 402 calculated at action 312 in the method illustrated in FIG. 4. The GUI screen 400 also includes a graphical representation of a measured performance parameter 404 and a target performance parameter 406. As previously described, in action 310, the measured performance parameter 404 is compared to the target performance parameter 406. Accordingly, the GUI screen 400 is another embodiment of a GUI that may be displayed in action 314.

The target performance parameters to which the measured performance parameters are compared in action 310 may vary depending on which performance attribute values are being calculated. In some embodiments, the target performance parameter 406 may be a target performance parameter range having an upper bound 408 and a lower bound 410. As illustrated in FIG. 5, the measured performance parameter 404 and the target performance parameter 406 are plotted as a function of drilling depth, whether true vertical depth, measured depth, percentage drilled relative to a total depth of the drilling operation, or percentage drilled relative to a total depth of a given formation material layer of a plurality of formation material layers within the subterranean formation 118. In other embodiments, the measured performance parameter 404 and the target performance parameter 406 may be plotted as a function of drilling time. The graphical representation of the GUI screen 400 may, optionally, identify by name 414 each of a plurality of formation materials making up a subterranean formation in which the measured performance parameter 404 is measured and for which the target performance parameter 406 is established. Lines 416 indicate a point at which formation material transitions occur in the subterranean formation. Therefore, the graphical representation of the GUI screen 400 illustrates a range of drilling depths over which each formation material exists (e.g., span) and the sequence of the formation materials within the subterranean formation.

As illustrated in FIG. 5, the performance attribute value 402 is the speed value 210, which as previously described, is calculated based at least upon ROP. The measured ROP may be compared to the upper bound 408 and the lower bound 410. Accordingly, a GUI interface may display both the performance attribute value 402 and measured performance parameter 404. For the speed value 210, the upper and lower bounds 408, 410 may be theoretical upper and lower ROP limits of the drilling assembly 114 based upon research, empirical studies, computer generated models and simulations, technical records relating to prior drilling operations, etc. In other embodiments, the upper and lower bounds 408, 410 may be upper and lower ROP limits previously measured in prior drilling operations under similar drilling conditions, including, but not limited to, in the same or substantially the same formation materials, at the same or substantially the same drilling depth and/or time, and using the same or substantially the same drilling assembly 114 design. The upper ROP limit may be the best ROP achieved in prior drilling operations under similar drilling conditions, and the lower ROP limit may be the worst ROP achieved in prior drilling operations under similar drilling conditions. As shown in FIG. 5, the upper and lower bounds 408, 410 may vary as a function of drilling depth. Accordingly, the prior drilling operation that establishes the upper bound 408 and lower bound 410 may vary as a function of drilling depth.

While FIG. 5 has been described with reference to the speed value, the present disclosure is not so limited. The GUI screen 400 may display the measured performance parameter 404 and the target performance parameter 406 for any other performance attribute value as previously described herein. In such embodiments, the GUI screen 400 may illustrate one of the upper bound 408 and the lower bound 410 and not the other. For the efficiency value 212, the measured performance parameter may be mechanical specific energy and the target performance parameter may be a theoretical maximum and minimum mechanical specific energy of the drilling assembly 114 based upon research, empirical studies, computer generated models and simulations, technical records relating to prior drilling operations, etc. In other embodiments, the target performance parameter may be a maximum and minimum mechanical specific energy limits of the drilling assembly 114 previously measured in prior drilling operations under similar drilling conditions.

For the health value 214, the measured performance parameter may be a measure of vibrations of the drilling assembly 114 by sensors 140, 142 from interactions of the drilling assembly 114 with the formation 118 and the target performance parameter may be a lower limit such as no vibrations as any vibration of the drilling assembly 114 is undesirable. In other embodiments, the target performance may be a maximum and minimum vibrations experienced by the drilling assembly 114 in prior drilling operations under similar drilling conditions.

For the quality value 216, the measured performance parameter may be a measure of the trajectory of the drilling path of the drilling operation, and the target performance parameter may be a measure of the planned trajectory of the planned drilling path of the drilling operation.

For the fracability value, the measured performance parameter may be a permeability of the formation 118 measured by sensors 142, and the target performance parameter may be a theoretical permeability of the formation 118 based upon research, empirical studies, computer generated models and simulations, technical records relating to prior drilling operations, etc.

For the producibility value, the measured performance parameter may be a measure of fluid content of the formation 118 measured by sensors 142, and the target performance parameter may be a theoretical fluid content of the formation 118 based upon research, empirical studies, computer generated models and simulations, technical records relating to prior drilling operations, etc.

For the hazard mitigation value, the measured performance parameter may be a measure of the number of corrections made to the drilling operation, such as adjustments in orientation of the drill bit 116 to correct for drilling path deviation, and the target performance parameter may be a lower limit such as no corrections as any corrections to the drilling operation indicates undesirable interactions of the drilling assembly 114 with the formation 118.

For the economics value, the measured performance parameter may be a measure of the actual cost per unit of drilling depth of the drilling operation, such as dollars per foot, and the target performance parameter may be a theoretical cost (e.g., budget) per unit of drilling depth of the drilling operation based upon research, empirical studies, computer generated models and simulations, technical records relating to prior drilling operations, etc.

FIG. 6 is a GUI screen 500 according to some embodiments of the present disclosure. The GUI screen 500 includes a multi-dimensional map 502 of a subterranean formation 504 comprised of a plurality of formation materials 506 in which the drilling operation is conducted. The GUI screen 500 also illustrates a trajectory, shape, and orientation of a drilling path 508 of the drilling operation including, but not limited to a surface wellbore segment, a vertical wellbore segment, a curved wellbore segment, or a lateral wellbore segment, if any, respective depths of any such wellbore segments, and formation materials 506 in which any such wellbore segments are formed.

In some embodiments, the GUI screen 500 is displayed at action 312 in the method described with reference to FIG. 4. The GUI screen 500 comprises a performance attribute value 512, which has been calculated at action 312, and/or a suggestion 514, which has been determined at action 320. The performance attribute value 512 and/or the suggestion 514 may be displayed on the multi-dimensional map 502 at a location along the drilling path 508, determined at action 306, at which the performance attribute value 512 is calculated and/or the suggestion 514 is determined. This location may be marked by an indicator 516. The GUI screen 500 may include a plurality of indicators such as indicators 518 at which performance attribute values and suggestions have been previously calculated and determined along the drilling path 508. In some embodiments, the indicators 516, 518 may be color coded. The color code may provide an indication to the evaluator that the performance attribute value 512 is acceptable such that adjustments to one or more drilling operating parameters is not necessary or may provide an indication to the evaluator that the performance attribute value 512 is unacceptable such that adjustments to one or more drilling operating parameters is necessary. For unacceptable performance attribute values, the color code may provide an indication to the evaluator as to a degree (e.g., severity) to which the performance attribute value 512 is unacceptable.

The GUI screen 500 may also include a graphical representation 522 of a measured performance parameter 520 measured in action 304 described in reference to FIG. 4. In some embodiments, the measured performance parameter 520 may be plotted as a function of drilling depth as previously described with respect to FIG. 5. The graphical representation 522 may be displayed adjacent to the multi-dimensional map 502 such that the measured performance parameter 520 is plotted and displayed adjacent the formation material 506 in which the measured performance parameter 520 was measured and/or such that the true vertical depth at which the measured performance parameter 520 was measured is plotted and displayed on the GUI screen 500.

Figure 7:
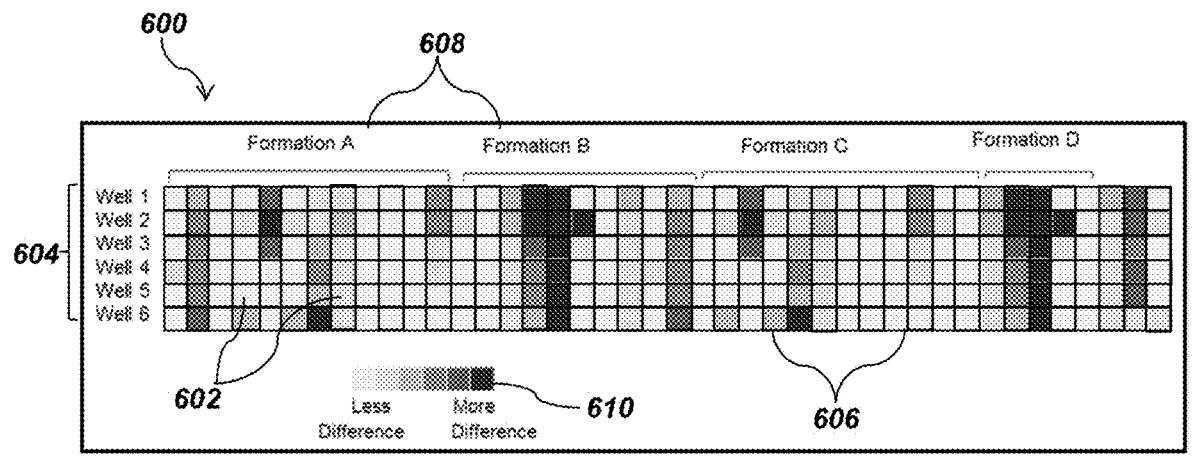

FIG. 7 is a GUI screen 600 according to additional embodiments of the present disclosure, which may be displayed in action 314. The GUI screen 600 is a graphical representation of performance of a drilling operation under analysis by the method described herein with reference to FIG. 4. The graphical representation includes a plurality of indicator tiles 602 arranged in rows 604 and columns 606. As previously described herein, the performance attribute values may be a weighted average of the percentage difference between the plurality of measured performance parameters and the plurality of target performance parameters. As also previously described herein, the target performance parameters may be determined from previously measured performance parameters in prior drilling operations under similar drilling conditions. Accordingly, each row 604 represents a previous wellbore (i.e., borehole) in which drilling operations have occurred and provides a target performance parameter against which the measured performance parameter is compared in action 310. Each column 606 represents a drilling depth at which the performance attribute value is calculated in action 312. The graphical representation may also include a listing of formation materials 608 in which the drilling operation under analysis occurs.

In some embodiments, the indicator tiles 602 are colored coded and normalized to a color scale 610. The color scale 610 indicates the degree of difference from low to high of the measured performance parameter and the previously measured performance parameter. Accordingly, the indicator tiles 602 may provide an indication to the evaluator that the performance attribute value is acceptable, which may be indicated by a low degree of difference, such that adjustments to one or more drilling operating parameters is not necessary or may provide an indication to the evaluator that the performance attribute value is unacceptable, which may be indicated by a high degree of difference, such that adjustments to one or more drilling operating parameters is necessary.

Figure 8:
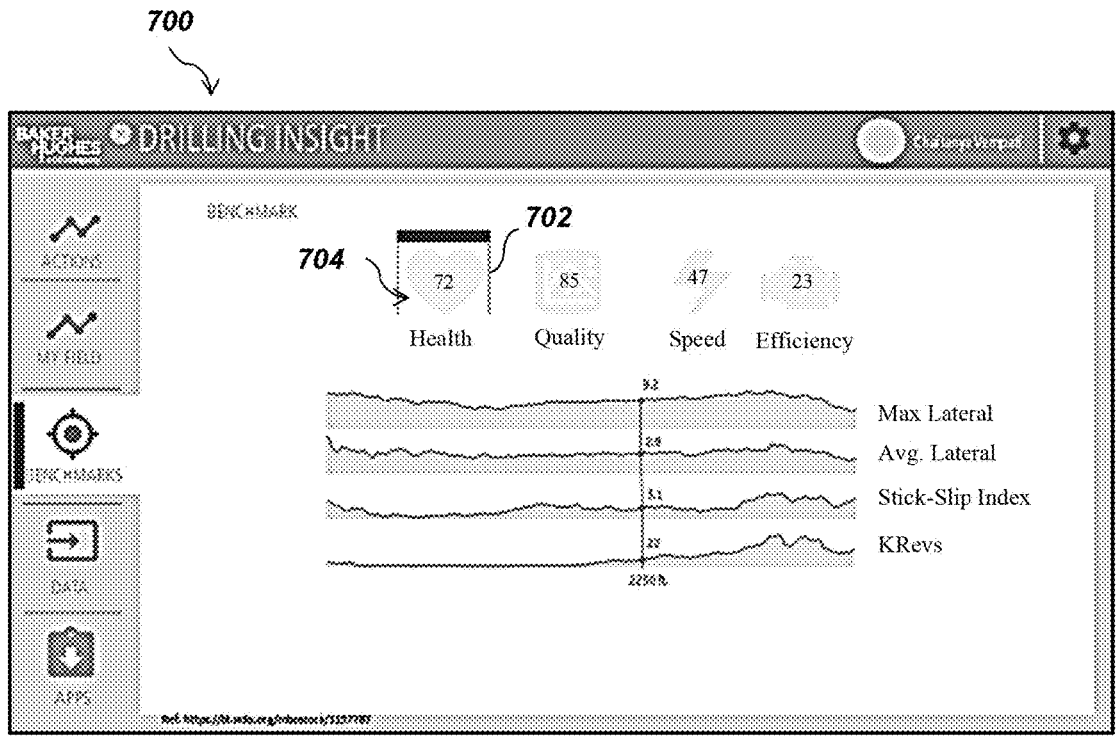

FIG. 8 is a GUI screen 700 according to additional embodiments of the present disclosure, which may be displayed in action 314. The GUI screen 700 comprises at least one performance attribute graphic 702 and associated performance attribute value 704. The GUI screen 700 also comprises a graphical representation of at least one measured performance parameter measured in action 304 and used to calculate the performance attribute value 704 in action 312. The measured performance parameters may be plotted as a function of drilling depth or drilling time in the graphical representation. In some embodiments, the evaluator may change the measure performance parameters presented on the GUI screen 700 by interacting with the GUI screen and selecting a different performance attribute value 704.

While the GUI screens have been described as being displayed during drilling operations, the present disclosure is not so limited. As previously described herein, during drilling, the measured performance parameters, the suggestions to adjust at least one drilling operating parameter, and the response to changing the drilling operating parameter may be recorded and used to improve the accuracy and sophistication of the process in identifying and selecting desirable suggestions. Accordingly, any of the GUI screens 200, 400, 500, 600, and 700 may be displayed in a post-drilling analysis. The post-drilling analysis may provide additional information that may be input in future drilling operations at, for example, action 302 in order to improve the accuracy and sophistication of the process in identifying and selecting desirable drilling operating parameters and drilling operating parameter adjustments prior to and during drilling operations.

Additional, nonlimiting embodiments within the scope of this disclosure include the following:

Embodiment 1

A system for drilling a subterranean wellbore, comprising a drilling assembly comprising a drill string and a drill bit; a sensor on the drill string; a sensor on the drill bit; and a control unit comprising a processor and a non-transitory memory device, the control unit operatively coupled to the drilling assembly to receive at least one performance parameter from at least one of the sensor on the drill string or the sensor on the drill bit, and to provide a control signal to adjust at least one drilling operating parameter of at least one of the drill string or the drill bit. The memory device stores an algorithm that, when executed by the processor, causes the control unit to compare the at least one measured performance parameter to at least one target performance parameter of at least one of the drill string or the drill bit, the at least one target performance parameter comprising at least one performance parameter of a prior drilling operation measured under substantially similar drilling conditions and measured at substantially a same drilling depth, substantially a same depth percent, or substantially a same drilling time, the at least one target performance parameter stored by the memory device; determine a performance attribute value by calculating a normalized, weighted average difference between the at least one measured performance parameter and the at least one target performance parameter; determine whether the performance attribute value is within a target performance attribute value range; and adjust the at least one drilling operating parameter responsive to a determination that the performance attribute value is not within the target performance attribute value range.

Embodiment 2

The system of Embodiment 1, wherein the control unit further comprises a display, and wherein the algorithm further causes the control unit to display a suggestion to adjust the at least one drilling operating parameter on a graphical user interface of the display such that the control unit adjusts the at least one drilling operating parameter responsive to a manual selection to adjust the at least one drilling operating parameter based on the suggestion.

Embodiment 3

The system of Embodiments 1, wherein the algorithm causes the control unit to adjust at least one drilling operating parameter comprises causing the control unit to automatically adjust the at least one drilling operating parameter such that the performance attribute value is within the target performance attribute range.

Embodiment 4

The system of any one of Embodiments 1 through 3, wherein the algorithm causes the control unit to compare the at least one measured performance parameter to at least one target performance comprises causing the control unit to compare a plurality of measured performance parameters to a plurality of target performance parameters; and the algorithm causes the control unit to determine a performance attribute value comprises causing the control unit to determine the performance attribute value by calculating a weighted average difference between the plurality of measured performance parameters to the plurality of target performance parameters and normalizing the weighted average difference on a scale of 0 to 100.

Embodiment 5

A method for evaluating performance of a drilling operation, comprising: during a drilling operation, receiving, at a control unit comprising a processor, a non-transitory memory, and a display, at least one performance parameter of at least one component of a drilling system measured by at least one sensor of the drilling system; comparing, at the processor, the at least one measured performance parameter to at least one target performance parameter of the at least one component of the drilling system, the at least one target performance parameter comprising at least one performance parameter of a prior drilling operation measured under substantially similar drilling conditions and measured at at least one of substantially a same depth relative to a total depth of the drilling operation and substantially a same depth relative to a total depth of a formation material layer; determining, at the processor, a performance attribute value by calculating a normalized, weighted average difference between the at least one measured performance parameter and the at least one target performance parameter; and displaying the performance attribute value on a graphical user interface of the display.

Embodiment 6

The method of Embodiment 5, wherein comparing, at the processor, the at least one measured performance parameter to at least one target performance parameter of the at least one component of the drilling system comprises comparing, at the processor, a plurality of measured performance parameters to a plurality of target performance parameters of the at least one component of the drilling system; and wherein determining, at the processor, the performance attribute value comprises determining, at the processor, a performance attribute value by calculating a weighted average difference between the plurality of measured performance parameters to the plurality of target performance parameters and normalizing the weighted average difference on a scale of 0 to 100.

Embodiment 7

The method of either of Embodiments 5 or 6, wherein displaying the performance attribute value on the graphical user interface comprises displaying a plurality of performance attribute values on the graphical user interface and dividing the plurality of performance attribute values into a plurality of categories, each of the plurality of categories representative of a different performance parameter of the drilling operation.

Embodiment 8

The method of any one of Embodiments 5 through 7, wherein displaying the performance attribute value on the graphical user interface comprises displaying the performance attribute value on the graphical user interface comprising at least one of a graphical representation and a numerical representation of the at least one measured performance parameter.

Embodiment 9

The method of any one of Embodiments 5 through 8, wherein displaying the performance attribute value on the graphical user interface comprises displaying the performance attribute value on a graphical user interface comprising a graphical representation of the at least one measured performance parameter compared to the at least one target performance parameter.

Embodiment 10

The method of any one of Embodiments 5 through 9, wherein displaying the performance attribute value on the graphical user interface comprises displaying the performance attribute value on a multi-dimensional map of the drilling operation illustrating a location of the at least one component along a drilling path of the drilling operation when the at least one measured performance parameter of the at least one component was received.

Embodiment 11

The method of any one of Embodiments 5 through 10, wherein the performance attribute value is indicative of an acceptable or unacceptable standard of performance of the drilling operation, and further comprising color coding the performance attribute value to indicate whether the performance attribute value is an acceptable or unacceptable value.

Embodiment 12

The method of any one of Embodiments 5 through 11, further comprising displaying a suggestion to adjust at least one drilling operating parameter of the drilling system on the graphical user interface.

Embodiment 13

A method of improving performance of a drilling operation, comprising: during a drilling operation, receiving, at a control unit comprising a processor, a non-transitory memory, and a display, at least one performance parameter of at least one component of a drilling system measured by at least one sensor of the drilling system; comparing, at the processor, the at least one measured performance parameter to at least one target performance parameter of the at least one component of the drilling system, the at least one target performance parameter comprising at least one performance parameter of a prior drilling operation measured under substantially similar drilling conditions and measured at at least one of substantially a same drilling depth, substantially a same depth percent, and substantially a same drilling time; determining, at the processor, a performance attribute value by calculating a normalized, weighted average difference between the at least one measured performance parameter and the at least one target performance parameter; determining, at the processor, whether the performance attribute value is within a target performance attribute value range; and adjusting at least one drilling operating parameter responsive to determining that the performance attribute value is not within the target performance attribute value range.

Embodiment 14

The method of Embodiment 13, wherein comparing the at least one measured performance parameter to the at least one target performance parameter comprises comparing the at least one measured performance parameter to at least one target performance range having an upper bound and a lower bound.

Embodiment 15

The method of either of Embodiments 13 or 14, further comprising generating a suggestion to adjust at least one drilling operating parameter and displaying the suggestion on the graphical user interface of the display responsive to determining that the performance attribute value is not within the target performance attribute range.

Embodiment 16

The method of any one of Embodiments 13 through 15, wherein the performance attribute value is indicative of an acceptable or unacceptable standard of performance of the drilling operation.

Embodiment 17

The method of any one of Embodiments 13 through 16, wherein calculating the performance attribute value comprises calculating a performance attribute value for a pre-selected drilling depth interval.

Embodiment 18

The method of any one of Embodiments 13 through 17, further comprising displaying the performance attribute value on a graphical user interface of the display.

Embodiment 19

The method of Embodiment 18, wherein displaying the performance attribute value on the graphical user interface comprises displaying a plurality of performance attribute values on the graphical user interface and dividing the plurality of performance attribute values into a plurality of categories, each of the plurality of categories representative of a different performance parameter of the drilling operation.

Embodiment 20

The method of either of Embodiments 18 or 19, wherein displaying the performance attribute value on the graphical user interface comprises displaying the performance attribute value on a graphical user interface comprising at least one of a graphical representation and a numerical representation of the at least one measured performance parameter.

Embodiment 21

The method of any one of Embodiments 18 through 20, wherein displaying the performance attribute value on the graphical user interface comprises displaying the performance attribute value on a graphical user interface comprising a graphical representation of the at least one measured performance parameter compared to the at least one target performance parameter.

Embodiment 22

The method of any one of Embodiments 13 through 21, wherein adjusting the at least one drilling operating parameter responsive to determining that the performance attribute value is not within the target performance attribute range comprises adjusting at least one drilling operating parameter such that the performance attribute value is within the target performance attribute range.

Embodiment 23

The method of any one of Embodiments 13 through 22, wherein: comparing, at the processor, the at least one measured performance parameter to at least one target performance parameter of the at least one component of the drilling system comprises comparing, at the processor, a plurality of measured performance parameters to a plurality of target performance parameters of the at least one component of the drilling system; and determining, at the processor, the performance attribute value comprises determining, at the processor, a performance attribute value by calculating a weighted average difference between the plurality of measured performance parameters to the plurality of target performance parameters and normalizing the weighted average difference on a scale of 0 to 100.

Embodiment 24

The method of any one of Embodiments 13 through 23, wherein comparing the at least one measured performance parameter to the at least one target performance parameter comprises comparing the at least one measured performance parameter to at least one target performance range having an upper bound and a lower bound.

Embodiment 25

The method of any one of Embodiments 13 through 24, wherein the performance attribute value is a measure of speed of the drilling operation, and wherein adjusting the at least one drilling operating parameter comprises adjusting at least one of weight-on-bit, torque, rotational speed of a drilling assembly, rate of penetration of the drilling assembly, aggressiveness of a drill bit, and differential pressure.

Embodiment 26

The method of any one of Embodiments 13 through 25, wherein the performance attribute value is a measure of efficiency of the drilling operation, and wherein adjusting at least one drilling operating parameter comprises adjusting at least one of weight-on-bit, torque, rotational speed of a drilling assembly, rate of penetration of the drilling assembly, aggressiveness of a drill bit, differential pressure, a drill bit design parameter, and a drill string design parameter.

Embodiment 27

The method of any one of Embodiments 13 through 26, wherein the performance attribute value is a measure of conformity of a drilling path of the drilling operation compared to a planned drilling path, and wherein adjusting at least one drilling operating parameter comprises adjusting at least one of weight-on-bit, torque, rotational speed of a drilling assembly, rate of penetration of the drilling assembly, aggressiveness of a drill bit, differential pressure, a design of the drilling assembly, an orientation of a drill bit face, and drilling methodology.

Embodiment 28

The method of any one of Embodiments 13 through 27, wherein the performance attribute value is a measure of susceptibility of a drilling assembly to damage responsive to undesirable interaction of a drilling assembly with a formation, and wherein adjusting at least one drilling operating parameter comprises adjusting at least one of weight-on-bit, torque, rotational speed of a drilling assembly, rate of penetration of the drilling assembly, aggressiveness of a drill bit, differential pressure, and a design of the drilling assembly.

While the disclosed systems and methods are susceptible to various modifications and alternative forms in implementation thereof, specific embodiments have been shown by way of example in the drawings and have been described in detail herein. However, it should be understood that the present disclosure is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A system for drilling a subterranean wellbore, comprising:
   a drilling assembly comprising a drill string and a drill bit;
   a sensor on the drill string;
   a sensor on the drill bit; and
   a control unit comprising a processor and a non-transitory memory device, the control unit operatively coupled to the drilling assembly to receive at least one performance parameter from at least one of the sensor on the drill string or the sensor on the drill bit and to provide a control signal to adjust at least one drilling operating parameter of at least one of the drill string or the drill bit, wherein the memory device stores an algorithm that, when executed by the processor, causes the control unit to:
      compare the at least one measured performance parameter to at least one target performance parameter of at least one of the drill string or the drill bit, the at least one target performance parameter comprising at least one performance parameter of a prior drilling operation measured under substantially similar drilling conditions and measured at substantially a same drilling depth, substantially a same depth percent, or substantially a same drilling time, the at least one target performance parameter stored by the memory device;
      determine each of at least a health performance value, a quality performance value, a speed performance value, and an efficiency performance value, each of the health performance value, the quality performance value, the speed performance value, and the efficiency performance value being determined by calculating a normalized, weighted average difference between the at least one measured performance parameter and the at least one target performance parameter;
         wherein the health performance value comprises a measurement of susceptibility of the drilling assembly to damage based at least partially on information relating to one or more of vibrations, stick slip, temperature, rotations per minute (RPM), bending moment, weight on bit (WOB), or mechanical specific energy,
         wherein the quality performance value is based at least partially on information relating to one or more of inclination and bending moment of the drilling assembly, build-up rate, presence of doglegs, quantity and quality of drilling, path corrections, slide drilling, or rotational drilling,
         wherein the speed performance value is based at least partially on information relating to a drilling rate, and
         wherein the efficiency rating is based at least partially on information relating to one or more of mechanical specific energy and hole cleaning efficiency;
      determine whether one or more of the health performance value, the quality performance value, the speed performance value, and the efficiency performance value is within a target performance value range for the respective performance value;
      determine a cumulative value representing a measure of an overall quality of a drilling operation, the cumulative value being determined based at least partially on each of the health performance value, the quality performance value, the speed performance value, and the efficiency performance value; and
      adjust the at least one drilling operating parameter responsive to a determination that one or more of the health performance value, the quality performance value, the speed performance value, and the efficiency performance value is not within the target performance value range for the respective performance value.

2. The system of claim 1, wherein the control unit further comprises a display, and wherein the algorithm further causes the control unit to display a suggestion to adjust the at least one drilling operating parameter on a graphical user interface of the display such that the control unit adjusts the at least one drilling operating parameter responsive to a manual selection to adjust the at least one drilling operating parameter based on the suggestion.

3. The system of claim 1, wherein the algorithm causes the control unit to adjust at least one drilling operating parameter comprises causing the control unit to automatically adjust the at least one drilling operating parameter such that the performance value is within the target performance range.

4. The system of claim 1, wherein:
   the algorithm causes the control unit to compare the at least one measured performance parameter to at least one target performance comprises causing the control unit to compare a plurality of measured performance parameters to a plurality of target performance parameters; and
   the algorithm causes the control unit to determine each of at least the health performance value, the quality performance value, the speed performance value, and the efficiency performance value comprises causing the control unit to determine each of the performance value, a quality performance value, a speed performance value, and an efficiency performance value by calculating a weighted average difference between the plurality of measured performance parameters to the plurality of target performance parameters and normalizing the weighted average difference on a scale of 0 to 100.

5. A method for evaluating performance of a drilling operation, comprising:
   during a drilling operation, receiving, at a control unit comprising a processor, a non-transitory memory, and a display, at least one performance parameter of at least one component of a drilling system measured by at least one sensor of the drilling system;
   comparing, at the processor, the at least one measured performance parameter to at least one target performance parameter of the at least one component of the drilling system, the at least one target performance parameter comprising at least one performance parameter of a prior drilling operation measured under substantially similar drilling conditions and measured at at least one of substantially a same depth relative to a total depth of the drilling operation and substantially a same depth relative to a total depth of a formation material layer;
   determining, at the processor, each of at least a health performance value, a quality performance value, a speed performance value, and an efficiency performance value, each of the health performance value, the quality performance value, the speed performance value, and the efficiency performance value being determined by calculating a normalized, weighted average difference between the at least one measured performance parameter and the at least one target performance parameter;
wherein the health performance value comprises a measurement of susceptibility of a drilling assembly to damage based at least partially on information relating to one or more of vibrations, stick slip, temperature, rotations per minute (RPM), bending moment weight on bit (WOB), or mechanical specific energy,
wherein the quality performance value is based at least partially on information relating to one or more of inclination and bending moment of a drilling assembly, build-up rate, presence of doglegs, quantity and quality of drilling path corrections, slide drilling, or rotational drilling,
wherein the speed performance value is based at least partially on information relating to a drilling rate, and
wherein the efficiency rating is based at least partially on information relating to one or more of mechanical specific energy and hole cleaning efficiency;
determining, at the processor, a cumulative value representing a measure of an overall quality of a drilling operation, the cumulative value being determined based at least partially on each of the health performance value, the quality performance value, the speed performance value, and the efficiency performance value, and
displaying the health performance value, the quality performance value, the speed performance value, and the efficiency performance value on a graphical user interface of the display.

6. The method of claim 5, wherein:
comparing, at the processor, the at least one measured performance parameter to at least one target performance parameter of the at least one component of the drilling system comprises comparing, at the processor, a plurality of measured performance parameters to a plurality of target performance parameters of the at least one component of the drilling system; and
determining, at the processor, the health performance value, the quality performance value, the speed performance value, and the efficiency performance value comprises determining, at the processor, each of the health performance value, the quality performance value, the speed performance value, and the efficiency performance value by calculating a weighted average difference between the plurality of measured performance parameters to the plurality of target performance parameters and normalizing the weighted average difference on a scale of 0 to 100.

7. The method of claim 5, wherein displaying each of the health performance value, the quality performance value, the speed performance value, and the efficiency performance on the graphical user interface comprises displaying the respective value on the graphical user interface comprising at least one of a graphical representation and a numerical representation of the at least one measured performance parameter.

8. The method of claim 5, wherein displaying each of the health performance value, the quality performance value, the speed performance value, and the efficiency performance on the graphical user interface comprises displaying the respective value on a graphical user interface comprising a graphical representation of the at least one measured performance parameter compared to the at least one target performance parameter.

9. The method of claim 5, wherein displaying each of health performance value, the quality performance value, the speed performance value, and the efficiency performance on the graphical user interface comprises displaying the respective value on a multi-dimensional map of the drilling operation illustrating a location of the at least one component along a drilling path of the drilling operation when the at least one measured performance parameter of the at least one component was received.

10. The method of claim 5, wherein each of the health performance value, the quality performance value, the speed performance value, and the efficiency performance is indicative of an acceptable or unacceptable standard of performance of the drilling operation, and further comprising color coding the respective performance value to indicate whether the respective value is an acceptable or unacceptable value.

11. The method of claim 5, further comprising displaying a suggestion to adjust at least one drilling operating parameter of the drilling system on the graphical user interface.

12. A method of improving performance of a drilling operation, comprising:
during a drilling operation, receiving, at a control unit comprising a processor, a non-transitory memory, and a display, at least one performance parameter of at least one component of a drilling system measured by at least one sensor of the drilling system;
comparing, at the processor, the at least one measured performance parameter to at least one target performance parameter of the at least one component of the drilling system, the at least one target performance parameter comprising at least one performance parameter of a prior drilling operation measured under substantially similar drilling conditions and measured at at least one of substantially a same drilling depth, substantially a same depth percent, and substantially a same drilling time;
determining, at the processor, each of at least a health performance value, a quality performance value, a speed performance value, and an efficiency performance value, each of the health performance value, the quality performance value, the speed performance value, and the efficiency performance value being determined by calculating a normalized, weighted average difference between the at least one measured performance parameter and the at least one target performance parameter;
wherein the health performance value comprises a measurement of susceptibility of a drilling assembly to damaged based at least partially on infoxrmation relating to one or more of vibrations, stick slip, temperature, rotations per minute (RPM), bending moment weight on bit (WOB), or mechanical specific energy,
wherein the quality performance value is based at least partially on information relating to one or more of inclination and bending moment of a drilling assembly, build-up rate, presence of doglegs, quantity and quality of drilling path corrections, slide drilling, or rotational drilling,
wherein the speed performance value is based at least partially on information relating to a drilling rate, and
wherein the efficiency rating is based at least partially on information relating to one or more of mechanical specific energy and hole cleaning efficiency;
determining, at the processor, whether one or more of the health performance value, the quality performance value, the speed performance value, and the efficiency performance value is within a target performance value range;

determining, at the processor, a cumulative value representing a measure of an overall quality of a drilling operation, the cumulative value being determined based at least partially on each of the health performance value, the quality performance value, the speed performance value, and the efficiency performance value, and adjusting at least one drilling operating parameter responsive to determining that one or more of the health performance value, the quality performance value, the speed performance value, and the efficiency performance value is not within the target performance value range for the respective performance value.

13. The method of claim 12, wherein comparing the at least one measured performance parameter to the at least one target performance parameter comprises comparing the at least one measured performance parameter to at least one target performance range having an upper bound and a lower bound.

14. The method of claim 12, further comprising generating a suggestion to adjust at least one drilling operating parameter and displaying the suggestion on a graphical user interface of the display responsive to determining that one or more of the health performance value, the quality performance value, the speed performance value, and the efficiency performance value is not within the target performance range.

15. The method of claim 12, wherein adjusting the at least one drilling operating parameter responsive to determining that one or more of the health performance value, the quality performance value, the speed performance value, and the efficiency performance value is not within the target performance range comprises adjusting at least one drilling operating parameter such that the respective performance value is within the target performance range.

16. The method of claim 12, wherein adjusting the at least one drilling operating parameter comprises adjusting at least one of weight-on-bit, torque, rotational speed of a drilling assembly, rate of penetration of the drilling assembly, aggressiveness of a drill bit, and differential pressure.

17. The method of claim 12, wherein adjusting at least one drilling operating parameter comprises adjusting at least one of weight-on-bit, torque, rotational speed of a drilling assembly, rate of penetration of the drilling assembly, aggressiveness of a drill bit, differential pressure, a drill bit design parameter, and a drill string design parameter.

18. The method of claim 12, wherein adjusting at least one drilling operating parameter comprises adjusting at least one of weight-on-bit, torque, rotational speed of a drilling assembly, rate of penetration of the drilling assembly, aggressiveness of a drill bit, differential pressure, a design of the drilling assembly, an orientation of a drill bit face, and drilling methodology.

19. The method of claim 12, wherein adjusting at least one drilling operating parameter comprises adjusting at least one of weight-on-bit, torque, rotational speed of a drilling assembly, rate of penetration of the drilling assembly, aggressiveness of a drill bit, differential pressure, and a design of the drilling assembly.

* * * * *

UNITED STATES PATENT AND TRADEMARK OFFICE
CERTIFICATE OF CORRECTION

PATENT NO. : 11,346,215 B2
APPLICATION NO. : 16/255441
DATED : May 31, 2022
INVENTOR(S) : Chaitanya K. Vempati and Tisha Dolezal It is certified that error appears in the above-identified patent and that said Letters Patent is hereby corrected as shown below:

In the Claims

| | | | |
|---|---|---|---|
| Claim 1, | Column 23, | Line 50, | change "drilling, path" to --drilling path-- |
| Claim 5, | Column 25, | Line 9, | change "moment weight" to --moment, weight-- |
| Claim 5, | Column 25, | Line 29, | change "value, and" to --value; and-- |
| Claim 12, | Column 26, | Line 49, | change "damaged" to --damage-- |
| Claim 12, | Column 26, | Line 49, | change "infoxrmation" to --information-- |
| Claim 12, | Column 26, | Line 52, | change "moment weight" to --moment, weight-- |
| Claim 12, | Column 27, | Line 10, | change "value, and" to --value; and-- |

Signed and Sealed this
Seventeenth Day of September, 2024

Katherine Kelly Vidal
*Director of the United States Patent and Trademark Office*